(12) United States Patent
Wisner et al.

(10) Patent No.: US 8,392,517 B2
(45) Date of Patent: Mar. 5, 2013

(54) ELECTRONIC COMMUNICATION CLARIFICATION SYSTEM

(76) Inventors: Charles Michael Wisner, Wayland, MA (US); Nathan Richard Wilson, Cambridge, MA (US); Darleen Susan Wilson, Bolton, MA (US)

( * ) Notice: Subject to any disclaimer, the term of this patent is extended or adjusted under 35 U.S.C. 154(b) by 677 days.

(21) Appl. No.: 12/616,774

(22) Filed: Nov. 11, 2009

(65) Prior Publication Data

US 2010/0293236 A1 Nov. 18, 2010

Related U.S. Application Data

(60) Provisional application No. 61/178,490, filed on May 14, 2009.

(51) Int. Cl.
*G06F 15/177* (2006.01)
(52) U.S. Cl. .................................. 709/206; 709/207
(58) Field of Classification Search ................ 709/206, 709/207
See application file for complete search history.

(56) References Cited

U.S. PATENT DOCUMENTS

| | | | | |
|---|---|---|---|---|
| 6,816,885 | B1 * | 11/2004 | Raghunandan | 709/206 |
| 7,328,244 | B1 * | 2/2008 | Kelley | 709/206 |
| 7,360,151 | B1 * | 4/2008 | Froloff | 715/255 |
| 7,475,109 | B1 * | 1/2009 | Fletcher et al. | 709/206 |
| 7,493,359 | B2 | 2/2009 | Fitzpatrick et al. | |
| 7,912,910 | B2 * | 3/2011 | Banerjee et al. | 709/206 |
| 2004/0078340 | A1 | 4/2004 | Evans | |
| 2005/0144245 | A1 | 6/2005 | Lowe | |
| 2005/0228790 | A1 * | 10/2005 | Ronnewinkel et al. | 707/6 |
| 2007/0100948 | A1 * | 5/2007 | Adams et al. | 709/206 |
| 2009/0129278 | A1 | 5/2009 | Kumar et al. | |

FOREIGN PATENT DOCUMENTS

| | | | |
|---|---|---|---|
| EP | 1 783 627 | * | 5/2007 |
| JP | 11-187020 A1 | | 7/1999 |
| KR | 10-2006-0111704 A | | 10/2005 |
| KR | 10-2006-0065487 | | 6/2006 |
| KR | 10-2007-0104646 A | | 10/2007 |

OTHER PUBLICATIONS

Sung-Shun Weng et al., Using text classification and multiple concepts to answer emails, Expert Systems with Applications 26, Pergamon-Elsevier Science Ltd, May 2004, pp. 529-543.*
Thomas W. Malone et al., Semistructured Messages are Surprisingly Useful for Computer-Supported Coordination, ACM Transactions on Office Information Systems, vol. 5, No. 2, Apr. 1987, pp. 115-131.*

* cited by examiner

*Primary Examiner* — Patrice Winder
(74) *Attorney, Agent, or Firm* — Ash Tankha; Lipton, Weinberger & Husick

(57) ABSTRACT

A computer implemented method and system is provided for clarifying electronic communication between an originator and a recipient. The originator declares characteristics of an originating message by specifying intent and linguistic type of communication using an application software provided on an originator communication device. The originator transmits the originating message to the recipient via a communication network. The application software on the recipient communication device recognizes the properties and declared characteristics for classification and categorization of the transmitted originating message. The application software determines requirement of a first response message as a reply to the transmitted originating message and generates response message templates that declare characteristics of the first response message based on the categorization. The recipient creates the first response message by selecting one of the response message templates and transmits the first response message to the originator. The communication loop continues until the electronic communication is declared complete.

22 Claims, 22 Drawing Sheets

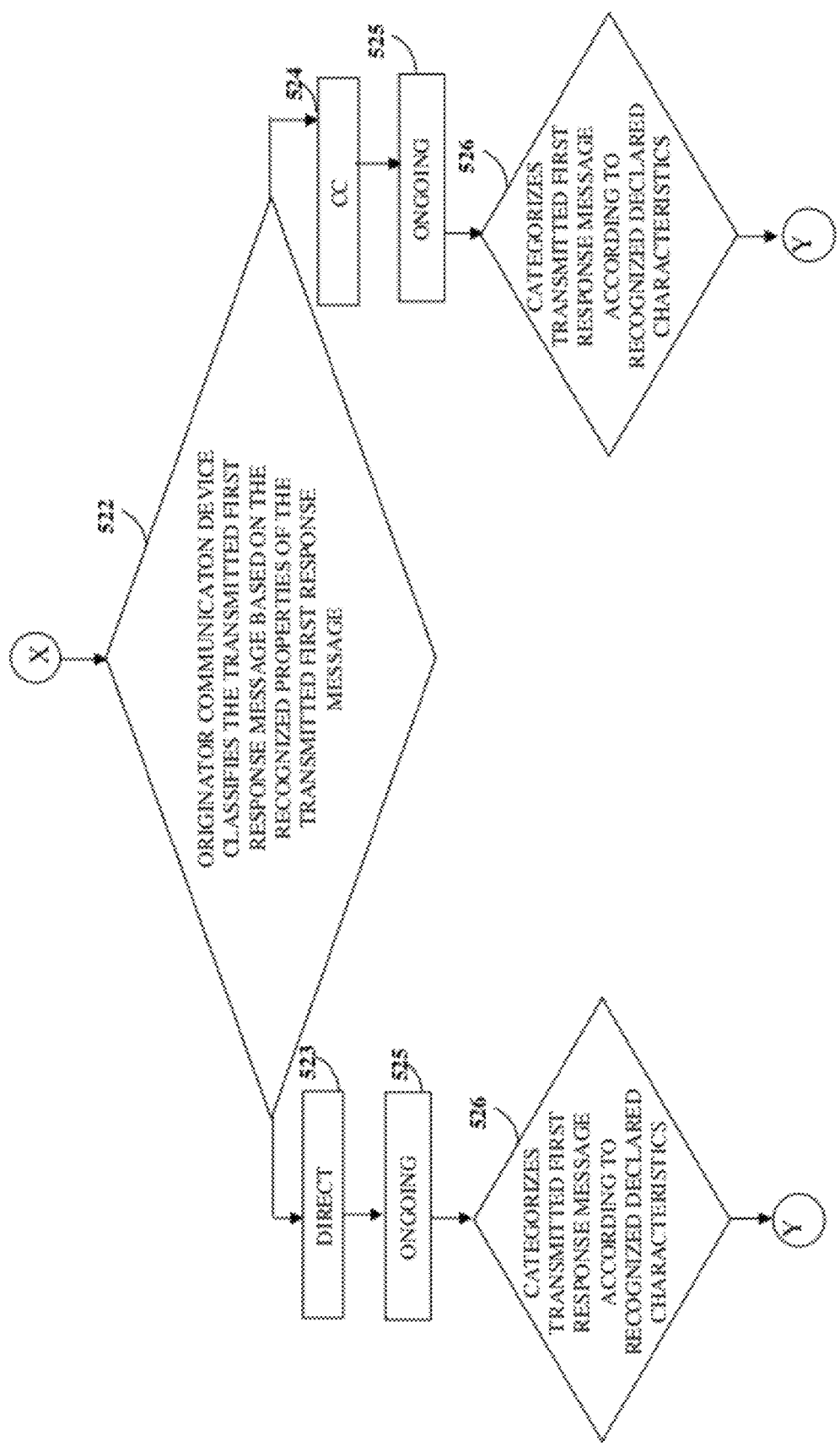

| ACTION TYPE | NEW COMMUNICATION SUBTYPES | ORIGINATING MESSAGE RESPONSE OPTIONS | | | | | | | |
|---|---|---|---|---|---|---|---|---|---|
| | | I'LL GET BACK TO YOU | REQUEST CLARIFICATION | COUNTER OFFER | OK/YES | NO | OK/YES - REQUEST ACKNOWLEDGMENT | NO - REQUEST ACKNOWLEDGMENT | THANKS/ ACKNOWLEDGMENT |
| REQUESTS | HELP | x | x | x | x | x | x | x | |
| | DECISION | x | x | x | x | x | x | x | |
| | MEETING | x | x | x | x | x | x | x | |
| | CALL | x | x | x | x | x | x | x | |
| | INFO | x | x | x | x | x | x | x | |
| | OPINION | x | x | x | x | x | x | x | |
| | PERSONAL | x | x | x | x | x | x | x | |
| OFFERS | HELP | x | | x | | | x | x | x |
| | DECISION | | | x | | | | | x |
| | DECISION - REQUEST ACKNOWLEDGMENT | | | | | | | | x |
| | THANKS | | | | | | | | x |
| | INFO | | x | x | | | | | x |
| | OPINION | | x | x | | | | | x |
| | PERSONAL | x | x | x | x | x | x | x | x |

FIG. 6

| ACTION TYPE | ONGOING COMMUNICATION RESPONSE TYPES | ONGOING COMMUNICATION RESPONSE OPTIONS | | | | | | | |
|---|---|---|---|---|---|---|---|---|---|
| | | I'LL GET BACK TO YOU | REQUEST CLARIFICATION | COUNTER OFFER | OK/YES | NO | OK/YES – REQUEST ACKNOWLEDGMENT | NO – REQUEST ACKNOWLEDGMENT | THANKS/ ACKNOWLEDGMENT |
| OFFER | I'LL GET BACK TO YOU | | X | X | | | | | X |
| REQUEST | REQUEST CLARIFICATION | X | X | X | X | | X | | |
| OFFER | COUNTER OFFER | X | X | X | X | X | X | X | |
| OFFER | OK/YES | | | | | | | | X |
| OFFER | OK/YES – REQUEST ACKNOWLEDGMENT | | | | | | | | X |
| OFFER | NO | | | | | | | | X |
| OFFER | NO – REQUEST ACKNOWLEDGMENT | | | | | | | | X |
| OFFER | THANKS/ACKNOWLEDGMENT | | | | | | | | |

FIG. 7

UNTITLED

FROM: NATHAN WILSON

TO:

FYI (CC): CHUCK@EXAMPLE.COM (?) REQUEST FOR DECISION

SUBJECT:

FIG. 12

ELECTRONIC COMMUNICATION CLARIFICATION SYSTEM

CROSS REFERENCE TO RELATED APPLICATIONS

This application claims the benefit of provisional patent application No. 61/178,490 titled "Electronic Communication Clarifier", filed on May 14, 2009 in the United States Patent and Trademark Office.
The specification of the above referenced patent application is incorporated herein by reference in its entirety.

BACKGROUND

Electronic communication enables users to communicate with one another in real time. Electronic communication also facilitates broadcasting of information. Electronic communication is performed via, for example, electronic mails (emails), short message service (SMS) messages, multimedia messaging service (MMS) messages, etc. Email communication is used for exchanging information between users. An email message comprises two components, for example, a message header component and a message body component. The message header component comprises the control information of an email message. The message header component is structured into fields, for example, a sender information field, a recipient information field, a date field, a subject field, a carbon copy (CC) field, etc. The sender information field comprises, for example, an address of the sender of the email message and optionally the name of the sender of the email message. The recipient information field is used for entering an address of the recipient of the email message and optionally the name of the recipient of the email message. The date information field states the local time and date on which the email message is received by the recipient. The date information field is automatically populated by an email application. The CC field is used for entering, for example, an address of a secondary recipient of the email message. The subject field comprises, for example, a brief summary of contents of the email message. The message body component comprises, for example, the content of the email message.

In current electronic communication technologies, the sender of an email message initiates the process of sending an email message by typing the recipient address in the primary recipient address field of the message header component on the sender communication device using, for example, a computer keyboard. The sender of the email message creates the content of the email message in the message body component using the computer keyboard. The email message created by the sender can optionally include email attachments. The sender of the email message types the address of the secondary recipient in the CC field of the message header component using the computer keyboard for sending a carbon copy of the email message to the secondary recipient. The sender optionally provides the subject of the email message being sent in the subject field of the message header component. The sender optionally flags the email message being sent to the recipient as, for example, a low priority email message, a medium priority email message, or a high priority email message. Most of the features in the process of sending an email message are optional to the sender. The sender may flag the message as low, medium, or high priority, CC other addresses, specify any subject line, and include a message of any length, with or without attachments. The use of email varies widely, and abuse of the email system is rampant. The net effect of this situation is that businesses, governments, and individuals are drowning in email. Consequently, the recipient becomes inundated with email messages. The overburdened communicators and compromised communications inhibit positive growth and change.

In a typical email communication, the type of message is not indicated. The recipient has to therefore check the content of each of the received email messages to ascertain the sender's intention. The lack of categorization gives rise to a clutter of email messages on the recipient communication device that complicates the task of responding by the recipient. Manual categorization is a time consuming process. The random messaging contained within each communication can lead to miscommunication and therefore ineffective correspondence between the sender and the recipient.

The recipient then has to create response email messages based on the checked content of the received email messages. There is a need for a mechanism that allows the sender of the email message to declare the nature and characteristics of the email message for clarifying the intent of the message and facilitating automatic categorization of the email message on the recipient communication device. Additionally, it is desirable to have multiple automatically generated response message templates with declared characteristics of the response on the recipient communication device to facilitate a faster and effective response by the recipient of the email message.

Hence, there is a need for a computer implemented method and system that clarifies electronic communication between an originator of an originating message and a recipient by allowing the originator to declare the characteristics of the originating message to be transmitted to the recipient for clarifying the originator's intent and for facilitating automatic categorization of the transmitted originating message on the recipient communication device. Moreover, there is a need for a computer implemented method and system that generates multiple response message templates that declare characteristics of a response message based on the categorization of the transmitted originating message on the recipient communication device for enabling the recipient to create the response message to be transmitted to the originator. Furthermore, there is a need for a computer implemented method and system that facilitates automatic categorization of the transmitted response message on the originator communication device, and generates multiple response message templates that declare characteristics of a response message based on the categorization of the transmitted response message on the originator communication device.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for clarifying electronic communication between an originator of an originating message and a recipient by allowing the originator to declare characteristics of the originating message to be transmitted to the recipient for clarifying the originator's intent and for facilitating automatic categorization of the transmitted originating message on the recipient communication device. The computer implemented method and system disclosed herein also generates multiple response message templates that declare characteristics of a response message based on the categorization of the transmitted originating message on the recipient communication device for enabling the recipient to create the response message to be transmitted to the originator. The computer implemented method and system also facilitates automatic categorization of the transmitted response message on the originator communication device, and generates multiple response message templates that declare characteristics of a response message based on the categorization of the transmitted response message on the originator communication device.

The computer implemented method disclosed herein comprises: a) providing an application software on one or more of an originator communication device and a recipient communication device; b) declaring characteristics of an originating message using the application software on the originator communication device, wherein the declaration specifies intent of communication and linguistic type of communication of the originating message, wherein the declaration is used for categorization by the application software on the recipient communication device and formulation of a first response message by the recipient; c) transmitting the originating message with the declared characteristics to the recipient communication device via a communication network; d) recognizing properties of the transmitted originating message by the application software on the recipient communication device, wherein the properties of the transmitted originating message comprise status of communication and mode of addressing the originating message; e) classifying the transmitted originating message by the application software on the recipient communication device based on the recognized properties of the transmitted originating message; f) recognizing the declared characteristics of the transmitted originating message by the application software on the recipient communication device, wherein the recognition enables the recipient to formulate a first response message to the transmitted originating message; g) categorizing the transmitted originating message by the application software on the recipient communication device based on the recognized declared characteristics of the transmitted originating message; h) determining requirement of a first response message as a reply to the transmitted originating message by the application software on the recipient communication device; i) generating multiple response message templates on the recipient communication device based on the categorization on determining the requirement of the first response message, wherein the response message templates declare characteristics of the first response message, wherein the declaration specifies intent of communication and linguistic type of communication of the first response message, wherein the recipient selects one of the generated response message templates for creating the first response message to be transmitted to the originator; and j) transmitting the created first response message to the originator communication device via the communication network; whereby the declaration of the characteristics of the originating message and the first response message clarifies the electronic communication between the originator and the recipient.

The electronic communication is, for example, electronic mail communication, short message service communication, multimedia messaging service communication, instant messaging communication, etc. The electronic communication is performed via, for example, electronic mails (emails), short message service (SMS) messages, multimedia messaging service (MMS) messages, etc. The linguistic type of communication specified during declaration of the characteristics is, for example, a request linguistic type of communication and an offer linguistic type of communication. The linguistic type of communication comprises multiple subtypes for enabling declaration of additional characteristics of the originating message and the first response message. The declared characteristics of the originating message are either embedded in the originating message or referenced by the originating message. The declared characteristics of the first response message are embedded in the first response message.

The application software on the originator communication device classifies the transmitted first response message based on the recognized properties of the transmitted first response message. The application software on the originator communication device categorizes the transmitted first response message based on the recognized declared characteristics of the transmitted first response message. The application software on the originator communication device then determines the requirement of a second response message as a reply to the transmitted first response message. The application software generates multiple response message templates that declare characteristics of the second response message to be created by the originator on the originator communication device based on the categorization on determining the requirement of the second response message. The originator selects one of the generated response message templates for creating the second response message and transmits the created second response message to the recipient communication device.

The application software on the originator communication device and the recipient communication device iteratively determines requirement of response messages until the electronic communication is declared complete.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

FIGS. 5A-5D exemplarily illustrate a flowchart comprising the steps of classifying and categorizing the transmitted originating message on the recipient communication device and creation of a first response message by the recipient to the transmitted originating message using the automatically generated response message templates on the recipient communication device.

FIGS. 5E-5H exemplarily illustrate a flowchart comprising the steps of classifying and categorizing the transmitted first response message on the originator communication device and creation of a second response message by the originator using the automatically generated response message templates on the originator communication device.

FIGS. 6-7 exemplarily illustrate generation of linguistic types and subtypes of communication used by the originator and the recipient for clarifying and categorizing electronic communication.

FIG. 9 exemplarily illustrates a template for creating an originating message by the originator.

FIG. 10 exemplarily illustrates a transmitted originating message received by the recipient.

FIG. 12 exemplarily illustrates a transmitted first response message received by the originator.

DETAILED DESCRIPTION OF THE INVENTION

Figure 1A:
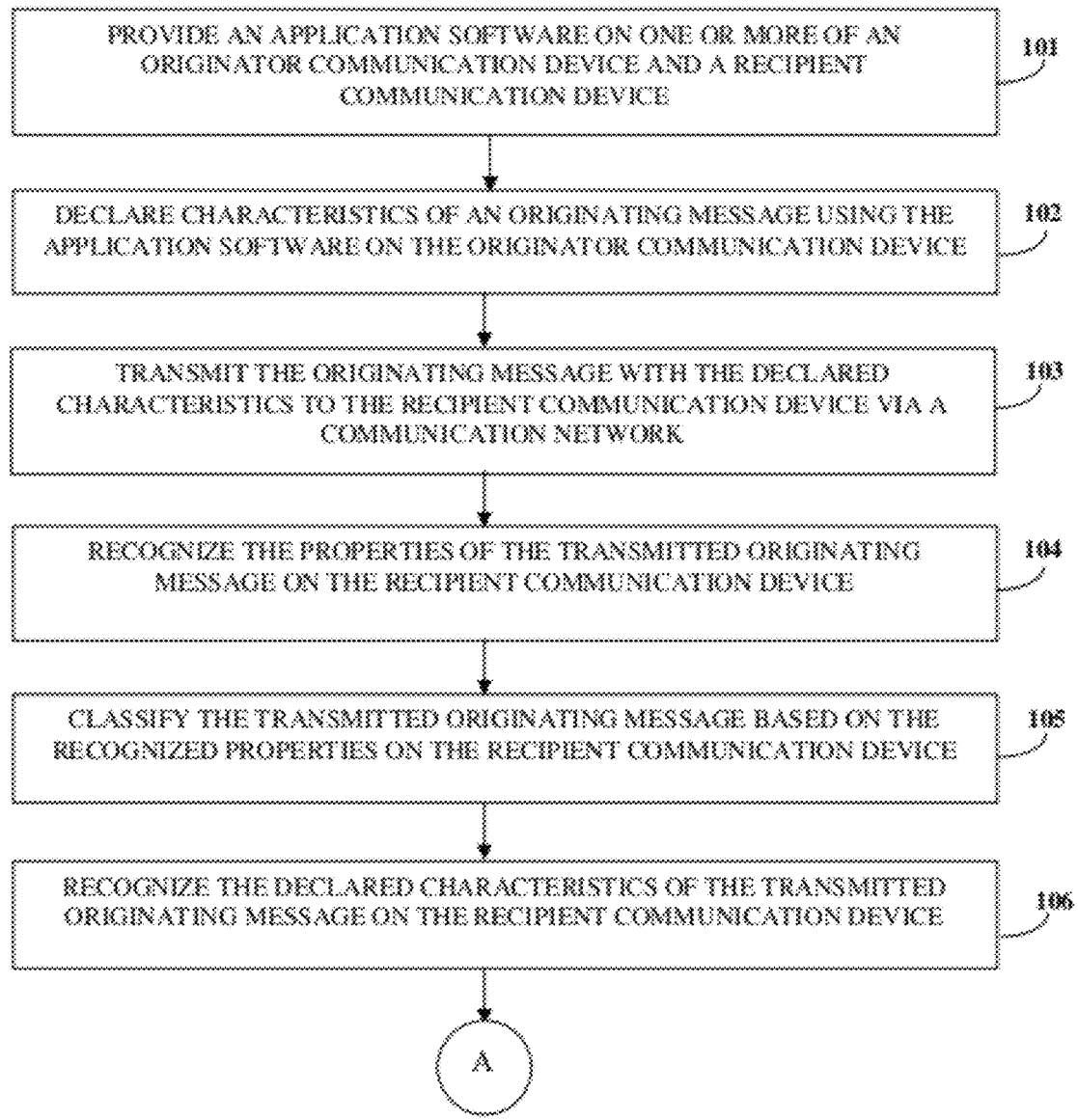
FIGS. 1A-1D illustrate a computer implemented method of clarifying electronic communication between an originator and a recipient.
Figure 1B:
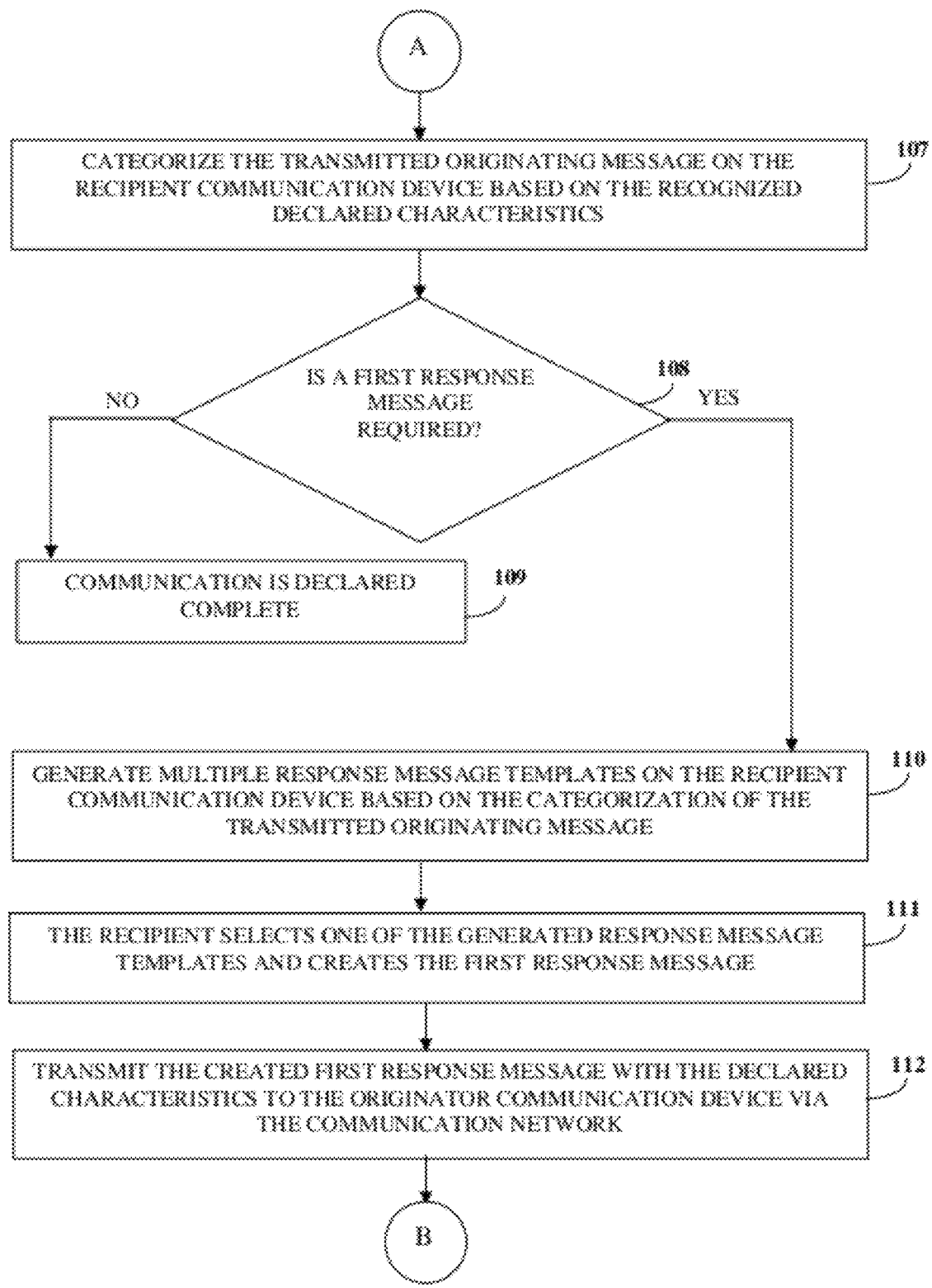
Figure 1C:
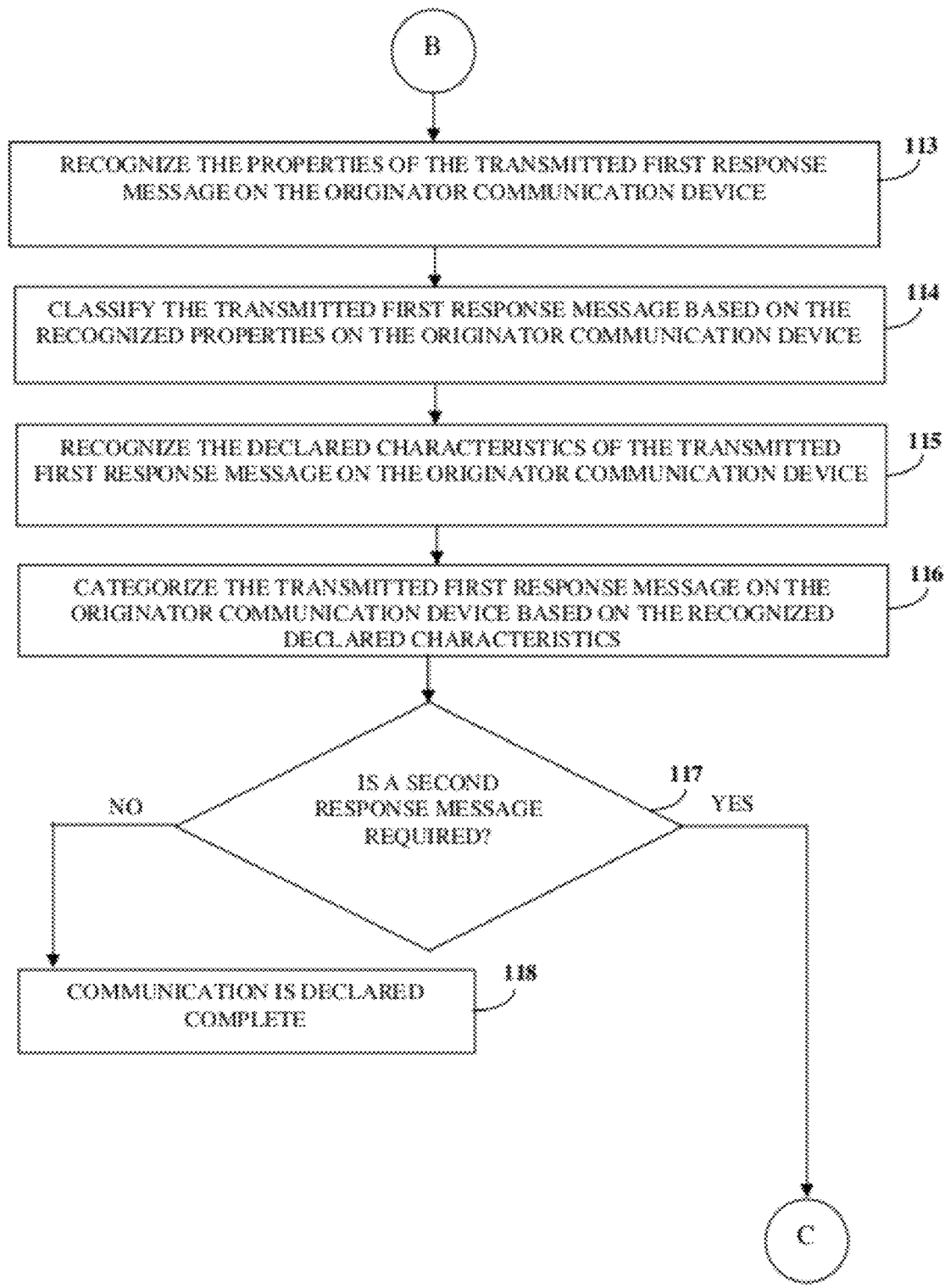
Figure 1D:
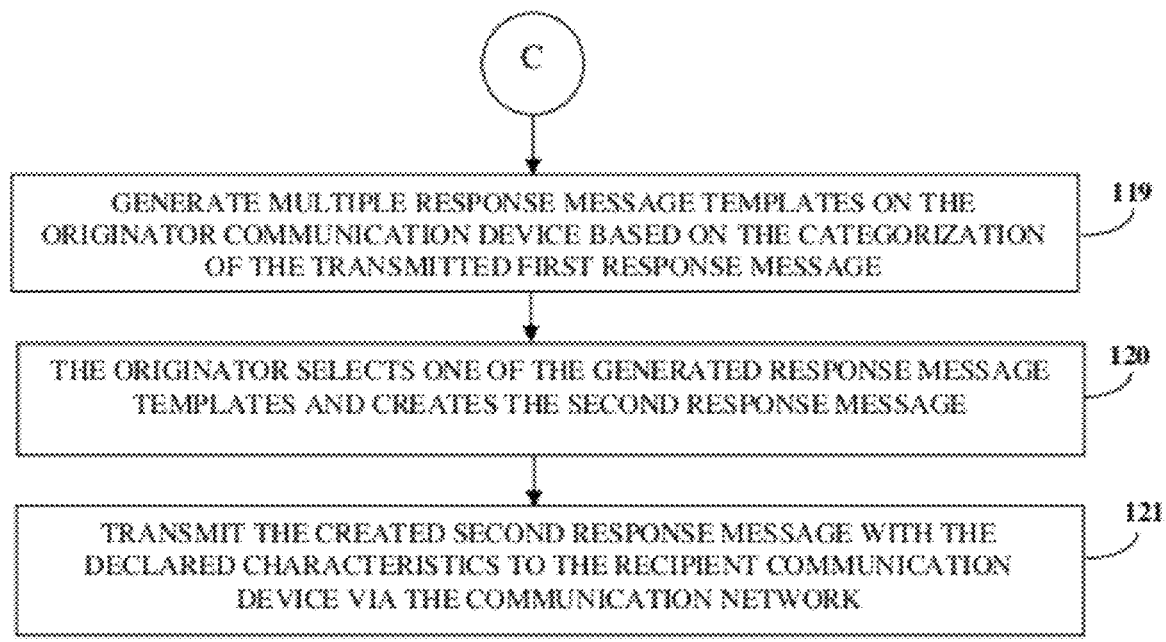

FIGS. 1A-1D illustrate a computer implemented method of clarifying electronic communication between an originator and a recipient. As used herein, the term "electronic communication" refers to, for example, electronic mail (email) communication, short message service (SMS) communication, multimedia messaging service (MMS) communication, instant messaging communication, etc. As used herein, the term "originator" refers to the sender of an originating message and the receiver of a first response message and subsequent response messages from the recipient. Also, as used herein, the term "recipient" refers to the receiver of the originating message and the sender of the first response message and subsequent response messages to the originator.

An application software is provided 101 on one or more of an originator communication device and a recipient communication device. The originator of an originating message initiates the electronic communication by, for example, declaring 102 characteristics of the originating message using the application software on the originator communication device. The originating message is, for example, an email message, an SMS message, an MMS message, etc. The declaration specifies intent of communication and linguistic type of communication of the originating message. The declaration allows the originator to specify the intention and purpose of the communication. The declaration is used for categorization of the originating message by the application software on the recipient communication device and formulation of a first response message by the recipient. As used herein, the term "first response message" refers to a response message created by the recipient as a reply to the transmitted originating message.

The linguistic type of communication is, for example, a request linguistic type of communication and an offer linguistic type of communication. The request linguistic type of communication and the offer linguistic type of communication comprises multiple subtypes for enabling declaration of additional characteristics of the originating message and the first response message. The subtypes of the request linguistic type of communication comprise, for example, a request decision, a request help, a request meeting, a request phone call, a request info, a request opinion, a personal request, etc. The subtypes of the offer linguistic type of communication comprise, for example, an offer decision, an offer help, an offer thanks, an offer decision—request acknowledgment, offer info, an offer opinion, a personal offer, etc.

The originator of the originating message declares the linguistic characteristics of the originating message by selecting from the list of subtypes of the request linguistic type of communication or by selecting from the list of subtypes of the offer linguistic type of communication. Consider an example where a first user wishes to schedule a business meeting with a second user. The first user sends an originating message to the second user to request for a meeting with the second user. The first user is herein referred to as the "originator". The second user is herein referred to as the "recipient". The originator initiates an originating message by declaring the linguistic characteristics of the originating message as the request linguistic type of communication and selects the subtype of a "request meeting" from the list of subtypes.

The originator creates the content of the originating message using the application software on the originator communication device. The originating message with the declared characteristics is transmitted 103 to a recipient via a communication network, for example, a WiFi communication network, a general packet radio service (GPRS) network, a mobile telecommunication network, a local area communication network, an internet connection network, a Bluetooth™ communication network, an infra red communication network, etc. A mobile telecommunication network is, for example, a global system for mobile (GSM) communication network, a code division multiple access (CDMA) network, a third generation (3G) mobile communication network, etc. The application software on the originator communication device either embeds the declared characteristics in the originating message or references the declared characteristics in the originating message for transmission.

The recipient communication device receives the transmitted originating message. The application software on the recipient communication device recognizes 104 the properties of the transmitted originating message. As used herein, the term "properties" refer to, for example, status of communication and mode of addressing the originating message. The term "status of communication" refers to, for example, new status and ongoing status. For example, when an originator transmits an originating message to the recipient for the first time, the communication is referred to as "new status". If the recipient transmits a first response message as a reply to the transmitted originating message transmitted by the originator, the communication is referred to as "ongoing status" and if the originator transmits a second response message as a reply to the first response message transmitted by the recipient, the communication is continued to be referred to as "ongoing status" between the originator and the recipient. As used herein, the term "second response message" refers to a response message created by the originator of the originating message as a reply to the transmitted first response message. The mode of communication is, for example, direct mode, carbon copy (CC) mode, blind carbon copy (BCC) mode, etc. Direct mode is a mode of communication where the originator addresses an originating message directly to a recipient by, for example, typing the address of the recipient in the primary address field of the originating message. CC mode is a mode of communication where a recipient is copied on an originating message so that the recipient receives a carbon copy of the originating message indirectly. The recipient is copied on an originating message by, for example, typing the address of the recipient in the CC field of the originating message. BCC mode is a mode of communication where a recipient is copied on an originating message anonymously so that the recipient receives a copy of the originating message without the recipient's address being revealed to other addressees. The application software on the recipient communication device determines whether the transmitted originating message is of a new status or of an ongoing status. The application software on the recipient communication device also determines whether the transmitted originating message is of a direct mode, a CC mode, or a BCC mode.

The application software on the recipient communication device classifies 105 the transmitted originating message based on the recognized properties of the transmitted originating message. For example, the application software on the recipient communication device classifies the transmitted originating message as, for example, of a new status and of direct mode.

The application software on the recipient communication device also recognizes 106 the declared characteristics of the transmitted originating message. The recognition of the declared characteristics enables the recipient to formulate a first response message to the transmitted originating message. The application software on the recipient communication device categorizes 107 the transmitted originating message based on the recognized declared characteristics of the transmitted originating message. For example, the application software on the recipient communication device categorizes the transmitted originating message as, for example, a request linguistic type of communication and of a subtype "request meeting" on the recipient communication device.

The application software on the recipient communication device determines 108 whether a first response message is required as a reply to the transmitted originating message from the recipient. If there is no requirement for the first response message from the recipient, the communication is fulfilled and declared 109 complete. Consider an example where an originator wishes to thank a recipient for wishing the originator on the originator's job promotion. The originator initiates an originating message by declaring the linguistic characteristics of the originating message as the offer linguistic type of communication and selects the subtype of "offer thanks" from the list of subtypes. The originator creates the originating message and transmits the created originating message to the recipient communication device. The application software on the recipient communication device determines that the transmitted originating message is of a new status and of direct mode. The application software on the recipient communication device categorizes the transmitted originating message as an offer linguistic type of communication and of subtype "offer thanks". In this case, the application software on the recipient communication device determines that a first response message is not required and declares the communication complete.

If a first response message is required as a reply to the transmitted originating message, the application software on the recipient communication device generates 110 multiple response message templates based on the categorization of the transmitted originating message on the recipient communication device. The generated response message templates declare characteristics and frame the content of the first response message to be created by the recipient. The declaration of the response message templates specifies the intent of communication and the linguistic type of communication of the first response message. For example, the application software on the recipient communication device generates multiple response message templates, for example, "I'll get back to you", "request clarification", "counteroffer", "ok/yes", "no", "ok/yes—request acknowledgment", "no—request acknowledgment", etc. which declare the characteristics of the response to the "request meeting" subtype.

The recipient selects 111 one of the generated response message templates and creates a first response message to be transmitted to the originator. For example, the recipient selects the response message template of "request clarification" to transmit a first response message to the originator asking the originator to clarify at least one or more points regarding the transmitted originating message, for example, the scheduled time of the meeting.

The recipient transmits 112 the created first response message with the declared characteristics to the originator communication device via the communication network. The declared characteristics are embedded in the created first response message. The transmission of the first response message to the originator communication device completes a first iteration of a communication loop between the originator and the recipient. For purposes of illustration, the detailed description refers to a single iteration of a communication loop between the originator and the recipient; however the scope of the computer implemented method and system disclosed herein is not limited to a single iteration of the communication loop but may be extended to include an almost unlimited number iterations of the communication loop, until the communication is fulfilled and completed.

On receiving the transmitted first response message from the recipient, the application software on the originator communication device recognizes 113 the properties, for example, status of communication and mode of addressing the first response message. The application software on the originator communication device classifies 114 the transmitted first response message based on the recognized properties of the transmitted first response message on the originator communication device. For example, the application software on the originator communication device classifies the transmitted first response message as, for example, of an ongoing status and of a direct mode on the originator communication device.

The application software on the originator communication device recognizes 115 the declared characteristics of the transmitted first response message. The recognition of the declared characteristics enables the originator to formulate a second response message to the transmitted first response message. The application software on the originator communication device categorizes 116 the transmitted first response message based on the recognized declared characteristics of the transmitted first response message. For example, the application software on the recipient communication device categorizes the transmitted first response message as, for example, request linguistic type of communication and of subtype "request clarification" on the originator communication device.

The application software on the recipient communication device determines 117 whether a second response message is required from the originator as a reply to the transmitted first response message. If the second response message is not required, the application software on the originator communication device declares 118 the communication complete. If a second response message is required, the application software on the originator communication device generates 119 multiple response message templates based on the categorization of the transmitted first response message. The generated response message templates declare the characteristics by specifying the intent of communication and the linguistic type of communication of the second response message to be created by the originator. The generated response message templates frame the content of the second response message. For example, the application software on the originator communication device generates multiple response message templates, for example, "I'll get back to you", "request clarification", "counteroffer", "ok/yes", "ok/yes—request acknowledgment", etc. which declare the characteristics of the response to the "request clarification" subtype.

The originator selects 120 one of the generated response message templates and creates the second response message. For example, the originator selects the response message template of "I'll get back to you" to create the second response message to be transmitted to the recipient indicating to the recipient that the originator would get back to the recipient with the answer to the clarification request of the recipient in due time. The declared characteristics of the second response message are embedded in the selected second response message template.

The application software on the originator communication device transmits 121 the second response message with the declared characteristics to the recipient communication device via the communication network. The application software inherently triggers the next iterations of communication by determining requirement of response messages on the originator communication device and the recipient communication device until the communication is declared complete.

Consider an example where an originator initiates an electronic communication using the application software on the originator communication device. The application software displays a graphical user interface (GUI), for example, a welcome screen, on the originator communication device. The originator declares the linguistic characteristics of an originating message as a request linguistic type of communication and of subtype "request decision" using the GUI. The application software on the originator communication device pops up a mail window to transmit the created originating message and embeds or references the declared characteristics of the originating message to the created originating message. The declared characteristics can be embedded as, for example, an internet email header, a Microsoft Outlook® custom user field, a hidden extensible markup language (XML) markup tag within the body of the originating message, another form of metadata embedded within the message information, a reference to such metadata on an external server, etc. The originating message now comprises, for example, the originator communication device address, for example, the internet protocol address of the originator communication device, the recipient communication device address, for example, the internet protocol address of the recipient communication device and a port number, for example, port 465, port 25, port 110, etc. The originating message is transmitted by the electronic mail transmission server, for example, a simple mail transfer protocol (SMTP) server to an electronic mail recipient server, for example, a post office protocol (POP) server, an internet message access protocol (IMAP) server, etc. The transmitted originating message is then transmitted to the recipient communication device.

The recipient checks the transmitted originating message and the act of receiving the transmitted originating message triggers a code which retrieves the declared characteristics of the transmitted originating message by, for example, parsing the internet email header, the hidden XML markup tag, or the location of metadata, etc. in which the declared characteristics are embedded. The application software on the recipient communication device then retrieves a list of acceptable response message templates, by using a lookup matrix stored within the application software. The application software on the recipient communication device generates a response window and renders "response choice buttons" according to the list of acceptable response templates to the recipient. The recipient selects one of these response templates, which then generates the first response window. The first response window embeds the declared characteristics specified by the selected response message template. The recipient creates the content of the first response message using the selected response message template and transmits the created first response message with the declared characteristics to the originator communication device.

Consider an example, where a student Rachel wants the solution to a mathematics problem from her mathematics professor, Janice. Rachel uses the application software installed on her communication device, a personal computer, with internet capabilities and initiates an electronic communication. Rachel declares the linguistic characteristics of the originating message as a request linguistic type of communication. Rachel declares the subtype of the originating message as request help. Rachel then types the mathematics problem in the content section of the originating message using a computer keyboard. The originating message with the declared characteristics is transmitted from Rachel's personal computer to Janice's communication device, for example, a mobile phone with internet capabilities. Janice receives the transmitted originating message on her mobile phone. The application software installed on Janice's mobile phone recognizes the properties of the transmitted originating message. The application software recognizes that the originating message is of new status and has been transmitted directly to Janice from Rachel. The application software on Janice's mobile phone classifies the originating message as of a new status and of direct mode. The application software recognizes the declared characteristics of the transmitted originating message. The application software categorizes the transmitted originating message as a request linguistic type of communication and of subtype request help. The application software determines that a first response message is required as a reply to the transmitted originating message and generates multiple response message templates based on the categorization of the transmitted originating message.

Janice selects the response template of "counteroffer ok/yes—request acknowledgment" and creates a first response message comprising the solution to the mathematics problem. The created first response message is transmitted to Rachel's personal computer via the internet. The application software on Rachel's personal computer recognizes that the first response message has been transmitted directly to Rachel by Janice. The application software classifies the transmitted first response message as of ongoing status and of direct mode. The application software recognizes the linguistic characteristics of the transmitted first response message and categorizes the transmitted first response message as a request linguistic type of communication and of response type "counteroffer ok/yes—request acknowledgment" on Rachel's personal computer. The application software determines that a second response message is required as a reply to the transmitted first response message and generates a list of response message templates. The generated message templates declare the characteristics of the second response message to be created by Rachel. Rachel selects the response message template of "thanks/acknowledgment", and creates the second response message. The created second response message with the declared characteristics is transmitted to Janice's mobile phone. The application software recognizes the linguistic characteristics of the transmitted second response message and categorizes the transmitted second response message as an offer linguistic type of communication and of subtype "thanks/acknowledgment" on Janice's mobile phone. The application software on Janice's mobile phone determines that a third response message is not required as a reply to the transmitted second response message and declares the communication complete.

Consider another example, where James, a manager of a knowledge resource team of a company wants to share some information with one of his team members, Mark. James also wants to make another team member, Steve, aware that he has shared some information with Mark. James uses the application software installed on his communication device, a laptop with internet capabilities, and initiates creation of an originating message. James declares the linguistic characteristics of the originating message as an offer linguistic type of communication. James declares the originating message as of subtype offer info. James types the information he wants to share with his team members in the content section of the originating message. James types the address of Mark in the primary recipient address section, for example, the "to" section, of the originating message. James types the address of Steve in the secondary recipient address section, for example, the CC section of the originating message. The originating message with the declared characteristics is transmitted from James' laptop to the communication devices, for example, laptops of Mark and Steve.

Mark and Steve receive the transmitted originating message. The application software installed on the Mark's laptop recognizes the properties of the transmitted originating message. The application software recognizes that the originating message is of new status and has been transmitted directly to Mark from James. The application software classifies the originating message as of a new status and of direct mode. The application software recognizes the declared characteristics of the transmitted originating message. The application software categorizes the transmitted originating message as an offer linguistic type of communication and of subtype offer info. The application software determines that a first response message is required as a reply to the transmitted originating message and generates multiple response message templates based on the categorization of the transmitted originating message. Mark selects the response message template of "thanks/acknowledgment" and creates a first response message. The created first response message is transmitted to James. The application software on James' laptop recognizes that the first response message has been transmitted directly to James by Mark. The application software classifies the transmitted first response message as of ongoing status and of direct mode. The application software recognizes the linguistic characteristics of the transmitted first response message and categorizes the transmitted first response message as an offer linguistic type of communication and of subtype "thanks/acknowledgment" on James' laptop. The application software determines that a second response message is not required as a reply to the transmitted first response message and declares the communication complete.

Steve also receives the transmitted originating message on his laptop. The application software installed on Steve's laptop recognizes the properties of the transmitted originating message. The application software classifies the originating message as of new status and of CC mode. The application software recognizes the declared characteristics of the transmitted originating message. The application software categorizes the transmitted originating message as an offer linguistic type of communication and of subtype offer info. The application software determines that a first response message is required as a reply to the transmitted originating message and generates multiple response message templates based on the categorization of the transmitted originating message. Steve selects the response message template of "request clarification" asking James to clarify one or more points regarding the transmitted originating message and creates a first response message. The created first response message is transmitted to James. The application software on James' laptop recognizes that the first response message has been transmitted directly to James by Steve. The application software classifies the transmitted first response message as of ongoing status and of direct mode. The application software recognizes the linguistic characteristics of the transmitted first response message and categorizes the transmitted first response message as a request linguistic type of communication and of response type "request clarification" on James' laptop. The application software determines that a second response message is required as a reply to the transmitted first response message and generates a list of response message templates. James selects the response message templates with the declared characteristic "ok/yes", and creates a second response message fulfilling the request for clarification. The created second response message is transmitted to Steve's laptop.

The declaration of the characteristics of the originating message and the first response message, the second response message, and subsequent response messages until the communication is declared complete, clarifies the electronic communication between the originator and the recipient.

Figure 2:
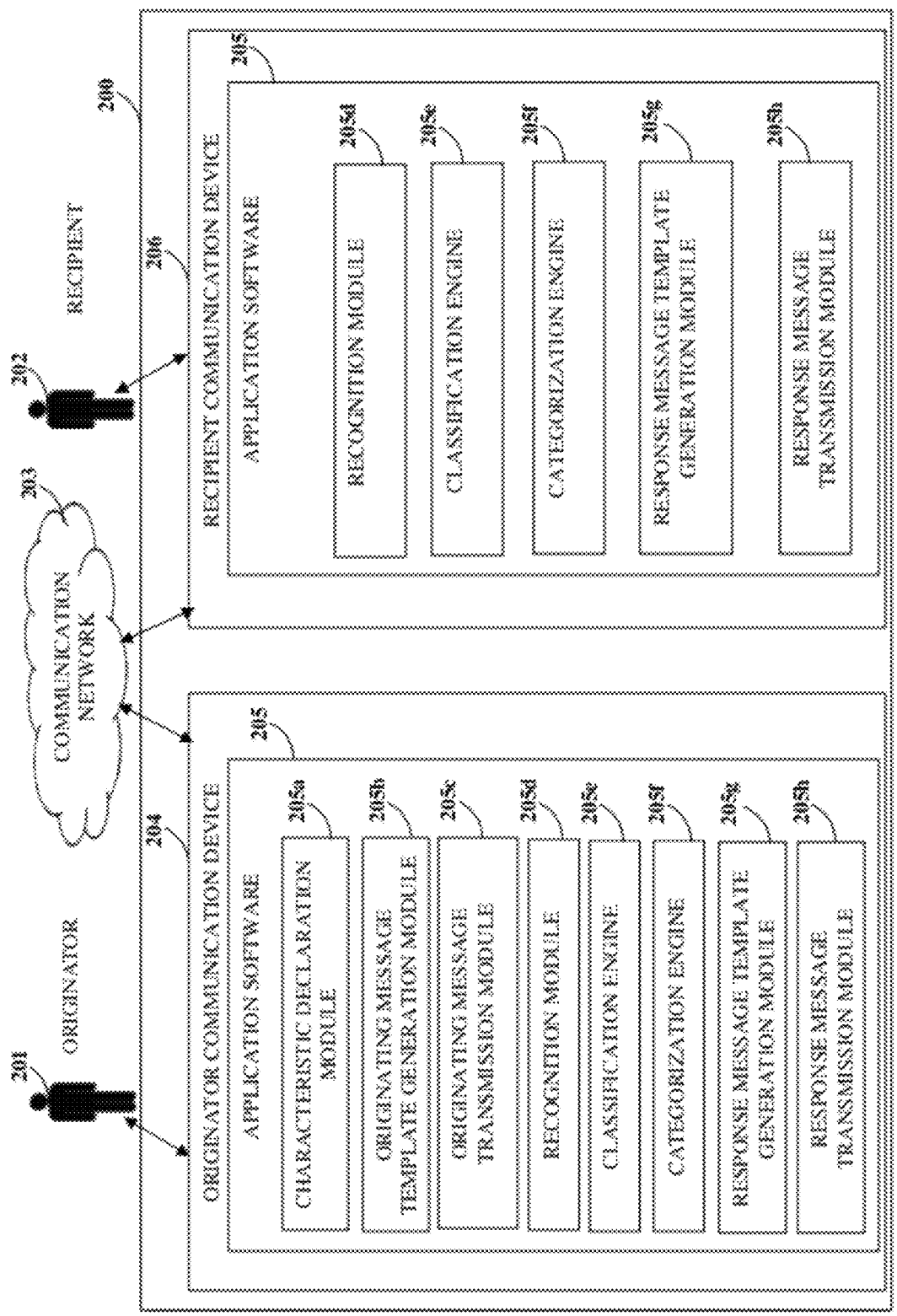
FIG. 2 illustrates a computer implemented system for clarifying electronic communication between an originator and a recipient.

FIG. 2 illustrates a computer implemented system 200 for clarifying electronic communication between an originator 201 and a recipient 202. The computer implemented system 200 disclosed herein comprises an application software 205 on one or more of an originator communication device 204 and a recipient communication device 206. The originator communication device 204 and the recipient communication device 206 are, for example, a personal computer, a laptop, a mobile phone with internet capabilities, a personal digital assistant (PDA), etc. The originator communication device 204 and the recipient communication device 206 are connected via a communication network 203. The application software 205 on the originator communication device 204 comprises a characteristic declaration module 205a, an originating message template generation module 205b, an originating message transmission module 205c, a recognition module 205d, a classification engine 205e, a categorization engine 205f, a response message template generation module 205g, and a response message transmission module 205h. The characteristic declaration module 205a declares characteristics of an originating message on the originator communication device 204. The characteristic declaration module 205a specifies intent of communication and linguistic type of communication of the originating message for enabling categorization of the originating message by the application software 205 on the recipient communication device 206 and formulation of a first response message by the recipient 202. The originating message template generation module 205b generates a template to frame the content of the originating message on the originator communication device 204. The originator 201 creates the originating message using the created template.

The originating message transmission module 205c transmits the originating message with the declared characteristics to the recipient communication device 206 via the communication network 203. The characteristic declaration module 205a either embeds the declared characteristics in the originating message or references the declared characteristics in the originating message.

The application software 205 on the recipient communication device 206 comprises the recognition module 205d, the classification engine 205e, the categorization engine 205f, the response message template generation module 205g, and the response message transmission module 205h. The recognition module 205d recognizes the properties and the declared characteristics of the transmitted originating message. The recognition module 205d also determines whether a first response message is required as a reply to the transmitted originating message. The recognition module 205d enables the recipient 202 to formulate the first response message as a reply to the transmitted originating message. The classification engine 205e classifies the transmitted originating message based on the recognized properties of the transmitted originating message. The categorization engine 205f categorizes the transmitted originating message on the recipient communication device 206 based on the recognized declared characteristics of the transmitted originating message. If a first response message is required as a reply to the transmitted originating message, the recognition module 205d instructs the response message template generation module 205g to generate multiple response message templates based on the categorization of the transmitted originating message. The response message templates declare characteristics of the first response message which specify intent of communication and linguistic type of communication of the first response message. The recipient 202 selects one of the generated response message templates and creates the first response message to be transmitted to the originator 201. The response message templates frame the content of the first response message. The response message transmission module 205h transmits the created first response message with the declared characteristics to the originator communication device 204 via the communication network 203.

The application software 205 on the originator communication device 204 receives the transmitted first response message. The recognition module 205d recognizes the properties and the declared characteristics of the transmitted first response message. The recognition module 205d also determines whether a second response message is required as a reply to the transmitted first response message. The recognition module 205d enables the originator 201 to formulate a second response message as a reply to the transmitted first response message. The classification engine 205e classifies the transmitted first response message on the originator communication device 204 based on the recognized properties of the transmitted first response message. The categorization engine 205f categorizes the transmitted first response message based on the recognized declared characteristics of the transmitted first response message. If a second response message is required as a reply to the transmitted first response message, the recognition module 205d instructs the response message template generation module 205g to generate multiple response message templates based on the categorization of the transmitted first response message. The response message templates declare characteristics of the second response message which specify intent of communication and linguistic type of communication of the second response message. The originator 201 selects one of the generated response message templates and creates the second response message to be transmitted to the recipient 202. The response message templates frame the content of the second response message. The response message transmission module 205h transmits the created second response message with the declared characteristics to the recipient communication device 206 via the communication network 203. The recognition module 205d iteratively determines requirement of response messages on the originator communication device 204 and the recipient communication device 206 until the electronic communication is declared complete.

Figure 3:
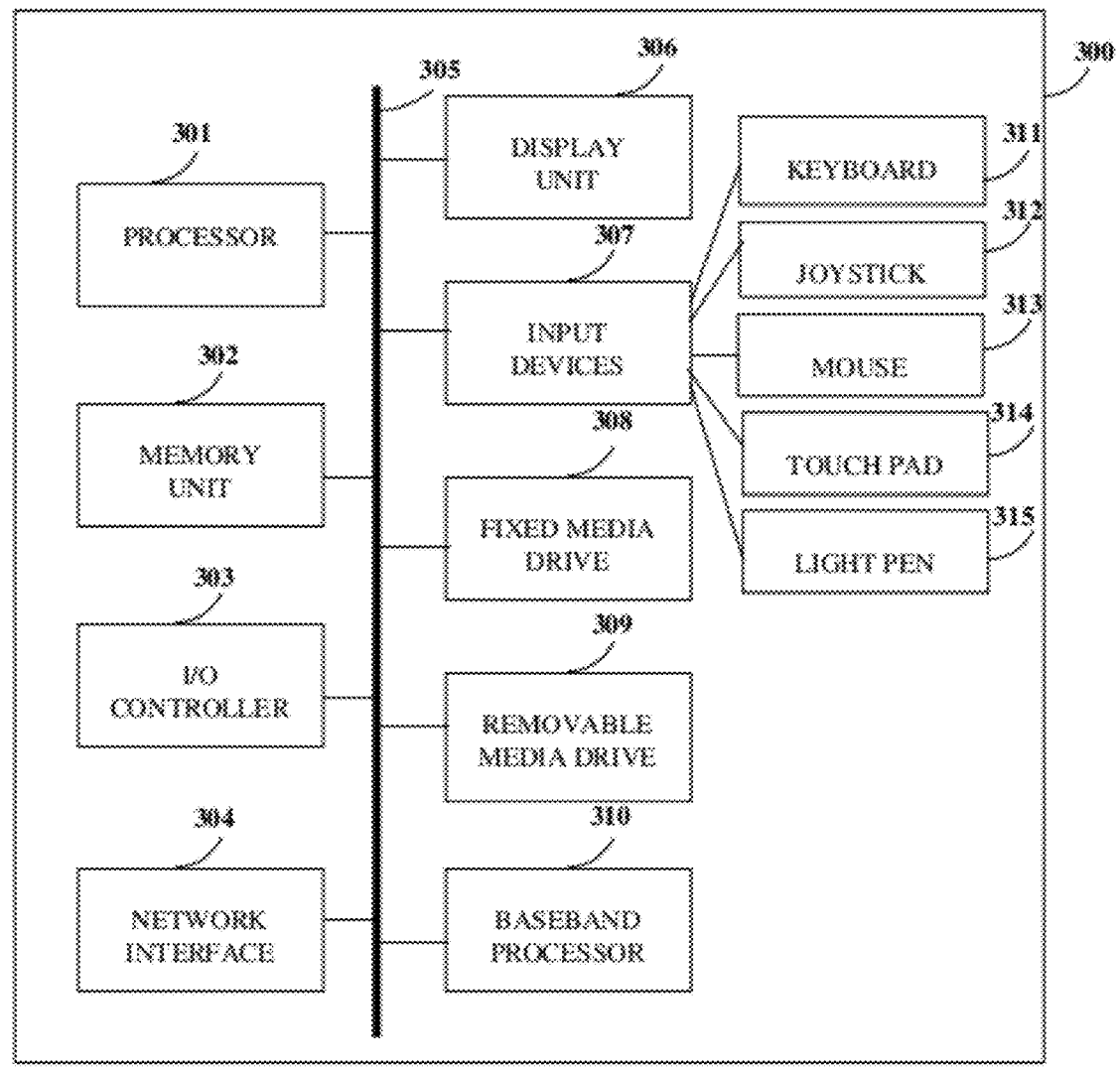
FIG. 3 exemplarily illustrates a computer system employed for clarifying electronic communication between an originator and a recipient.

FIG. 3 exemplarily illustrates a computer system 300 employed in the originator communication device 204 and the recipient communication device 206 for clarifying electronic communication between an originator 201 and a recipient 202. The application software 205 is deployed on, for example, the computer system 300 of the originator communication device 204 and the recipient communication device 206.

The originator communication device 204 and the recipient communication device 206 communicate with each other via the communication network 203. The communication network 203 is, for example, a local area network (LAN), a wide area network (WAN), a cellular network, a satellite network, etc. The computer system 300 comprises, for example, a processor 301, a memory unit 302 for storing programs and data, an input/output (I/O) controller 303, a network interface 304, a network bus 305, a display unit 306, input devices 307, a fixed media drive 308, a removable media drive 309, a baseband processor 310, etc.

The processor 301 is an electronic circuit that executes computer programs. The memory unit 302 is used for storing programs and applications. The application software 205 is, for example, stored on the memory unit 302 of the computer system 300. The memory unit 302 is, for example, a random access memory (RAM) or another type of dynamic storage device that stores information and instructions for execution by the processor 301. The memory unit 302 also stores temporary variables and other intermediate information used during execution of the instructions by the processor 301. The computer system 300 further comprises a read only memory (ROM) or another type of static storage device that stores static information and instructions for the processor 301. The network interface 304 enables connection of the computer system 300 to the communication network 203. In case of a mobile computing device, the network interface 304 connects the computing device wirelessly to the communication network 203. The mobile computing device further comprises a baseband processor 310 for processing communication functions and managing communication transactions with the communication network 203. The I/O controller 303 controls the input and output actions performed by the originator 201 and the recipient 202. The network bus 305 permits communication between the modules, for example, 205a, 205b, 205c, 205d, 205e, 205f, 205g, and 205h of the application software 205.

The display unit 306 displays computed results to the originator 201 and the recipient 202. The input devices 307 are used for inputting data into the computer system 300. The input devices 307 are, for example, a keyboard 311 such as an alphanumeric keyboard, a joystick 312, a mouse 313, a touch pad 314, a light pen 315, etc. The computer system 300 further comprises a fixed media drive 308 and a removable media drive 309 for receiving removable media.

Computer applications and programs are used for operating the computer system 300. The programs are loaded onto the fixed media drive 308 and into the memory unit 302 of the computer system 300 via the removable media drive 309. In an embodiment, the computer applications and programs may be loaded directly through the communication network 203. Computer applications and programs are executed by double clicking a related icon displayed on the display unit 306 using one of the input devices 307. The originator 201 and the recipient 202 interact with the computer system 300 using a graphical user interface (GUI) of the display unit 306.

The computer system 300 of the originator communication device 204 and the recipient communication device 206 employs operating systems for performing multiple tasks. An operating system is responsible for the management and coordination of activities and the sharing of the resources of the computer system 300. The operating system further manages security of the computer system 300, peripheral devices connected to the computer system 300, and network connections. The operating system employed on the computer system 300 recognizes, for example, inputs provided by the originator 201 and the recipient 202 using one of the input devices 307, the output display, files and directories stored locally on the fixed media drive 308, etc. The operating system on the computer system 300 of the originator communication device 204 executes different programs initiated by the originator 201 and the recipient 202 using the processor 301. Instructions for executing the application software 205 are retrieved by the processor 301 from the program memory in the form of signals. The location of the instructions in the program memory is determined by a program counter (PC). The program counter stores a number that identifies the current position in the program of the application software 205.

The instructions fetched by the processor 301 from the program memory after being processed are decoded. After processing and decoding, the processor 301 executes the instructions. For example, the characteristic declaration module 205a defines the instructions for declaring the characteristics of the originating message or the first response message. The recognition module 205d defines the instructions for recognizing the properties and the declared characteristics of the transmitted originating message or the transmitted first response message. The recognition module 205d also defines the instructions for iteratively determining requirement of response messages on the originator communication device 204 and the recipient communication device 206 until the electronic communication is declared complete. The classification engine 205e defines the instructions for classifying the transmitted originating message or the transmitted first response message based on the recognized properties. The categorization engine 205f defines the instructions for categorizing the transmitted originating message or the transmitted first response message based on the declared characteristics. The response message template generation module 205g defines the instructions for generating multiple response message templates based on the categorization of the transmitted originating message or the transmitted first response message. The defined instructions are stored in the program memory or received from a remote server.

The processor 301 retrieves the instructions defined by the characteristic declaration module 205a, the recognition module 205d, the classification engine 205e, the categorization engine 205f, the response message template generation module 205g, etc. and executes the instructions.

For purposes of illustration, the detailed description refers to the application software 205 being run locally on a computer system 300; however the scope of the computer implemented method and system 200 disclosed herein is not limited to the application software 205 being run locally on a computer system 300 via the operating system and the processor 301 but may be extended to run remotely over the communication network 203 by employing a web browser and remote server, mobile phone, or other electronic devices.

The application software 205 for clarifying electronic communication may also be implemented on operating systems for mobile devices, for example, Windows Mobile®, Symbian, Google™ Android, or Apple® iPhone. Mobile implementation uses similar algorithms but may involve different hardware interfaces. For example, selection of a response message template by an originator 201 or recipient 202 may be performed via a touch screen or voice recognition, and messages may be created using an on-screen keypad or slide-out keyboard, communicating with client software on the mobile device or in a mobile browser. Message transmission then occurs using the mobile device's internet capabilities via a communication network 203, for example, a WiFi network, a satellite network, a cellular network, etc. The application software 205 may also be implemented on two different devices, for example, a desktop and a mobile device, to facilitate communication between them.

Figure 4:
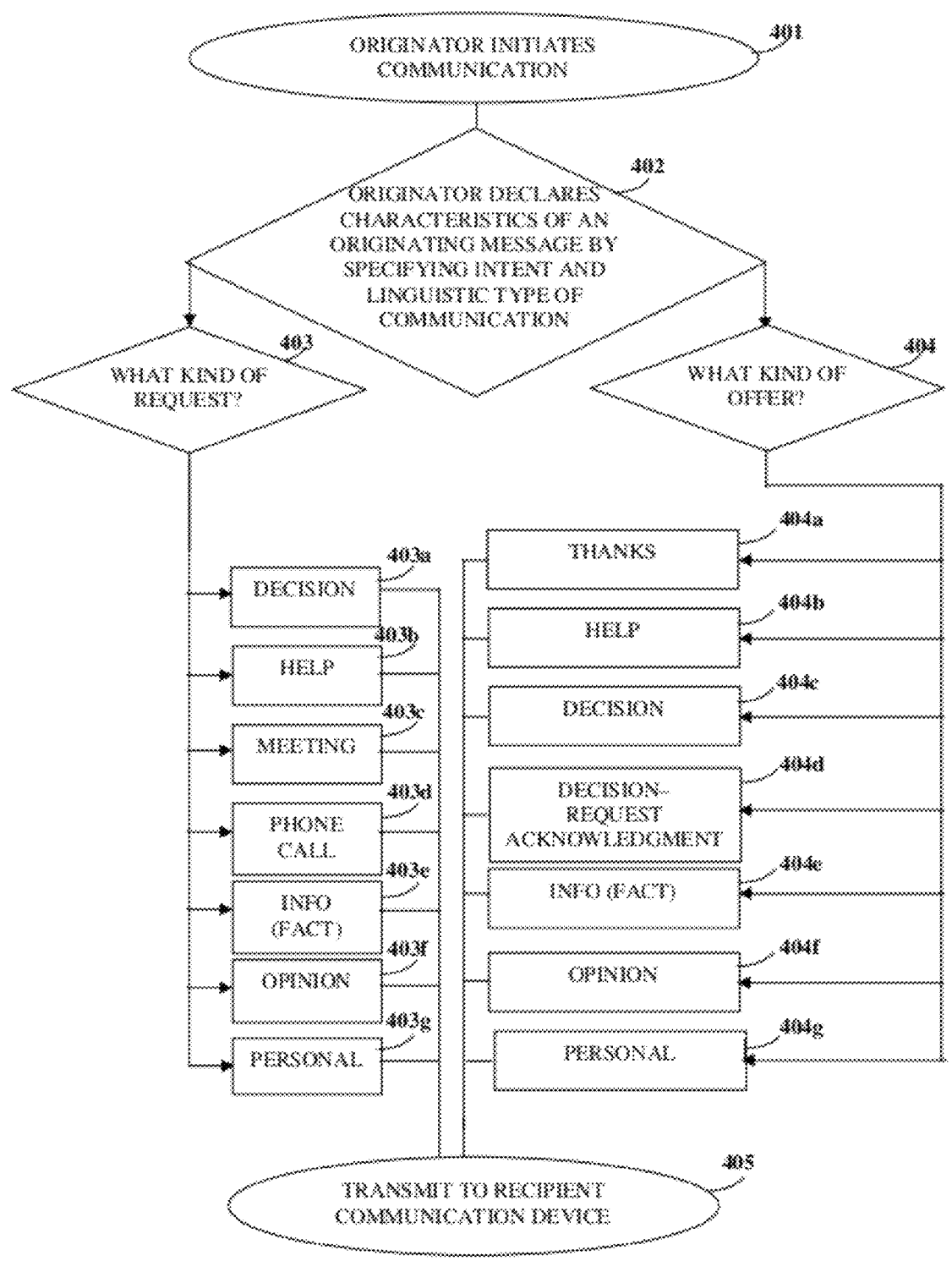
FIG. 4 exemplarily illustrates a flowchart comprising the steps of declaring characteristics of an originating message and transmitting the originating message by an originator of the originating message to a recipient.
Figure 5A:
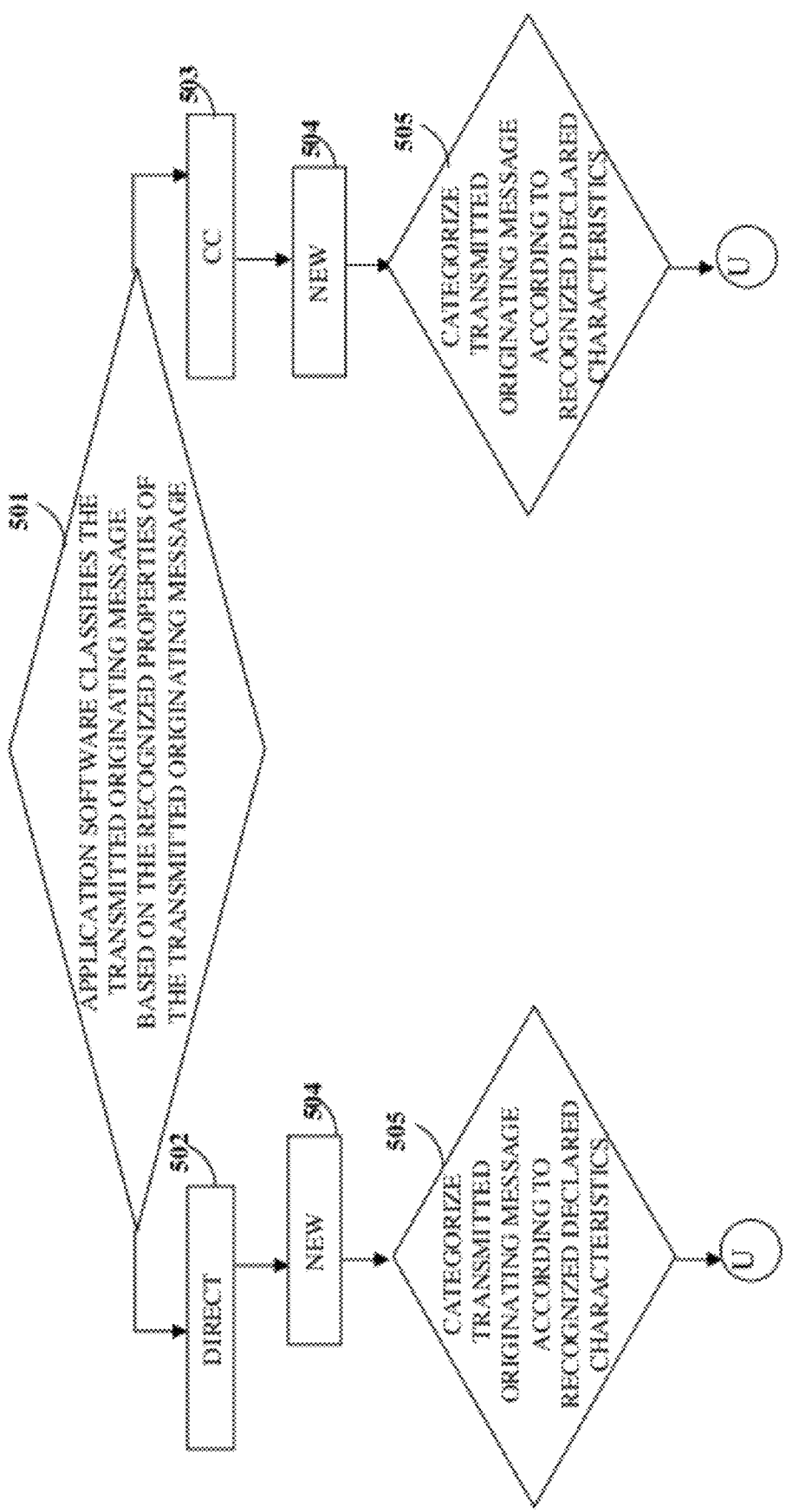
Figure 5D:
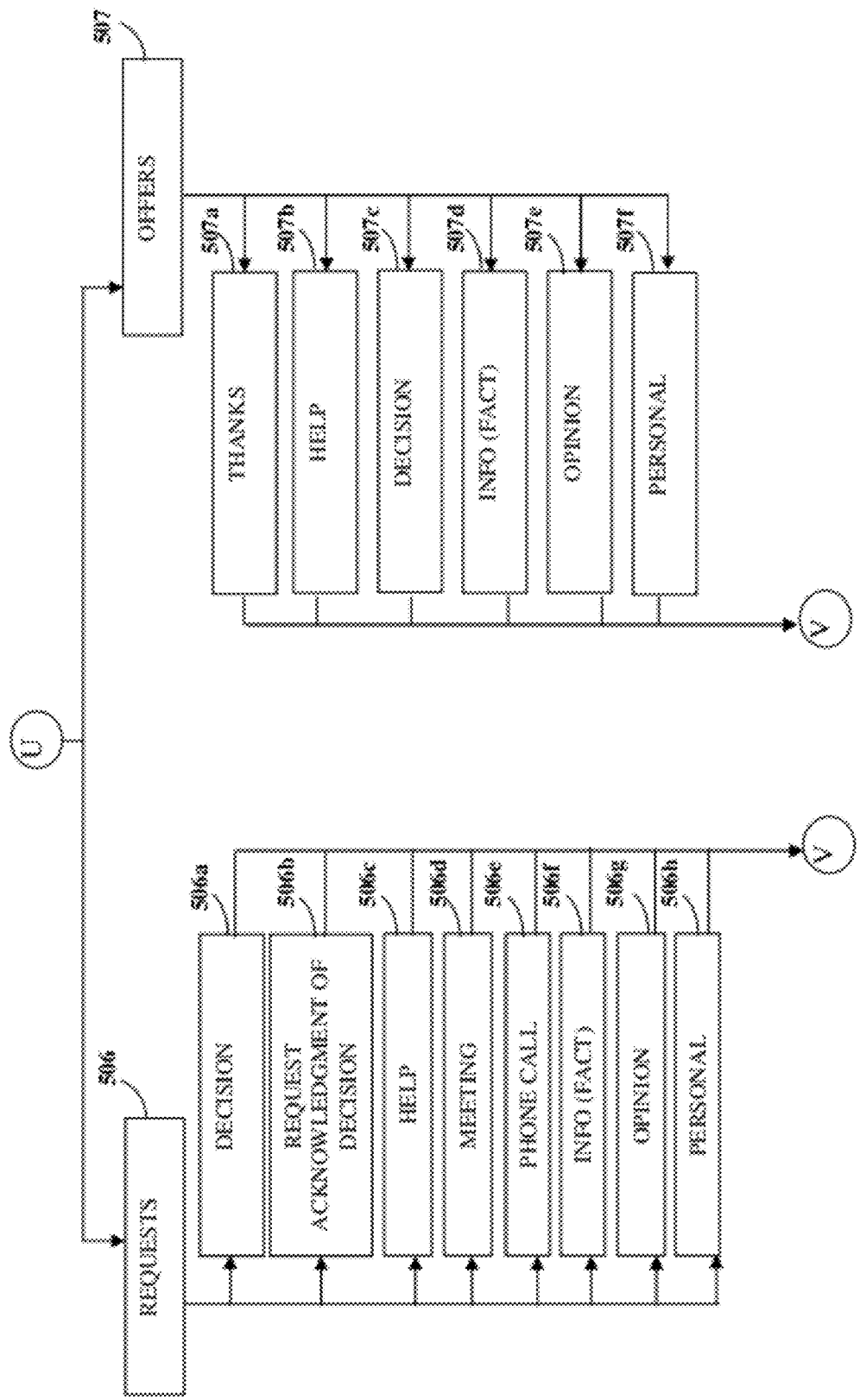
Figure 5C:
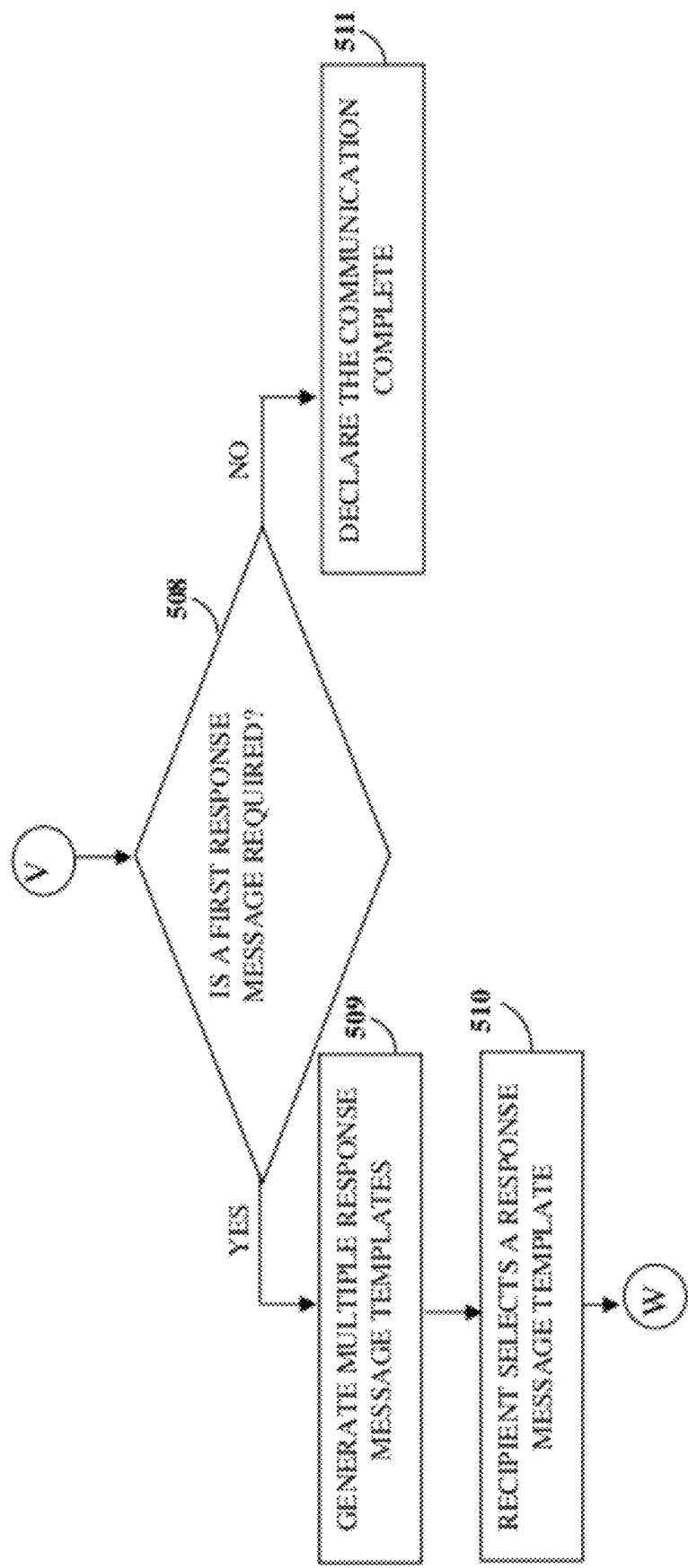
Figure 5D:
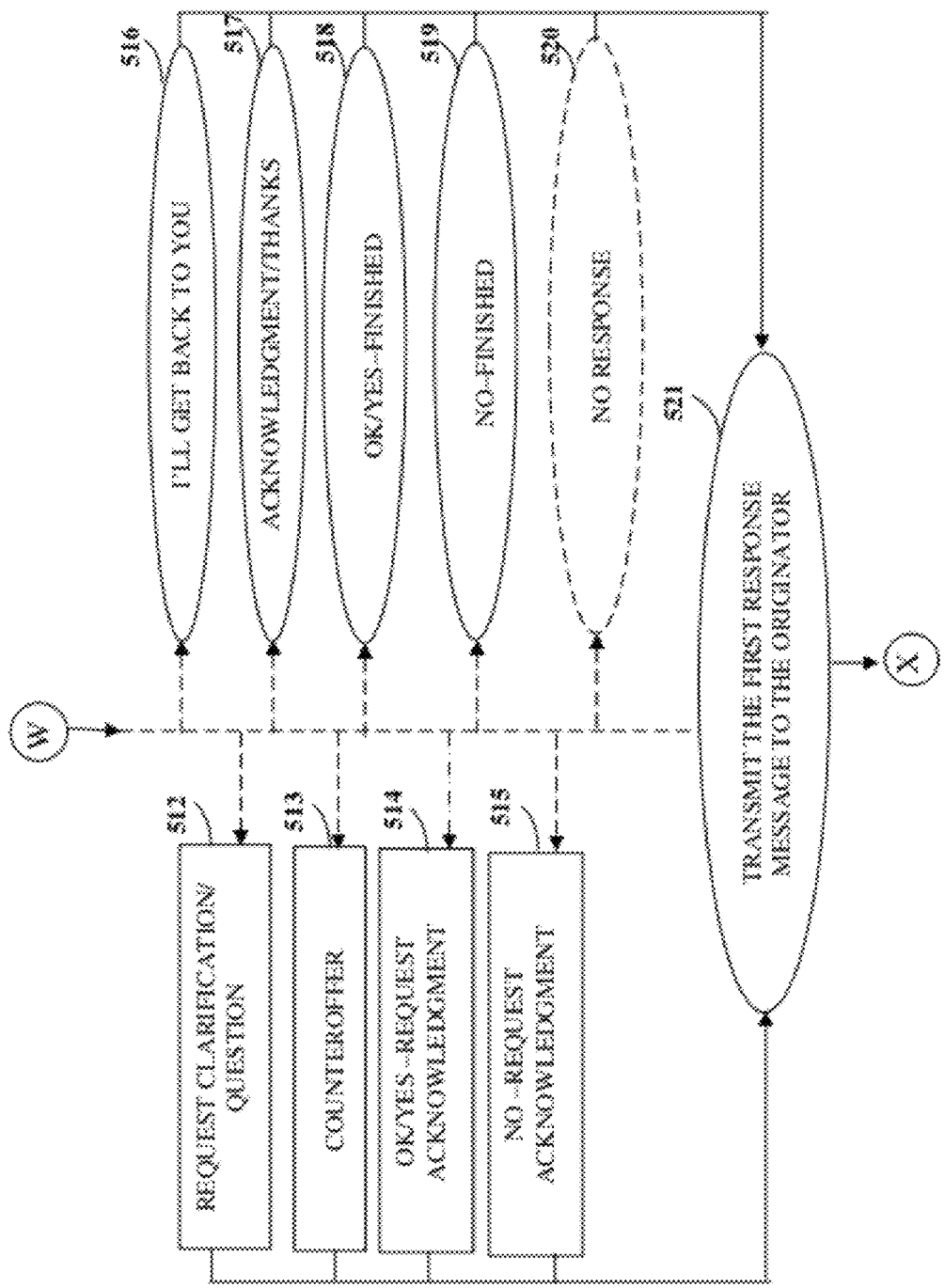
Figure 5F:
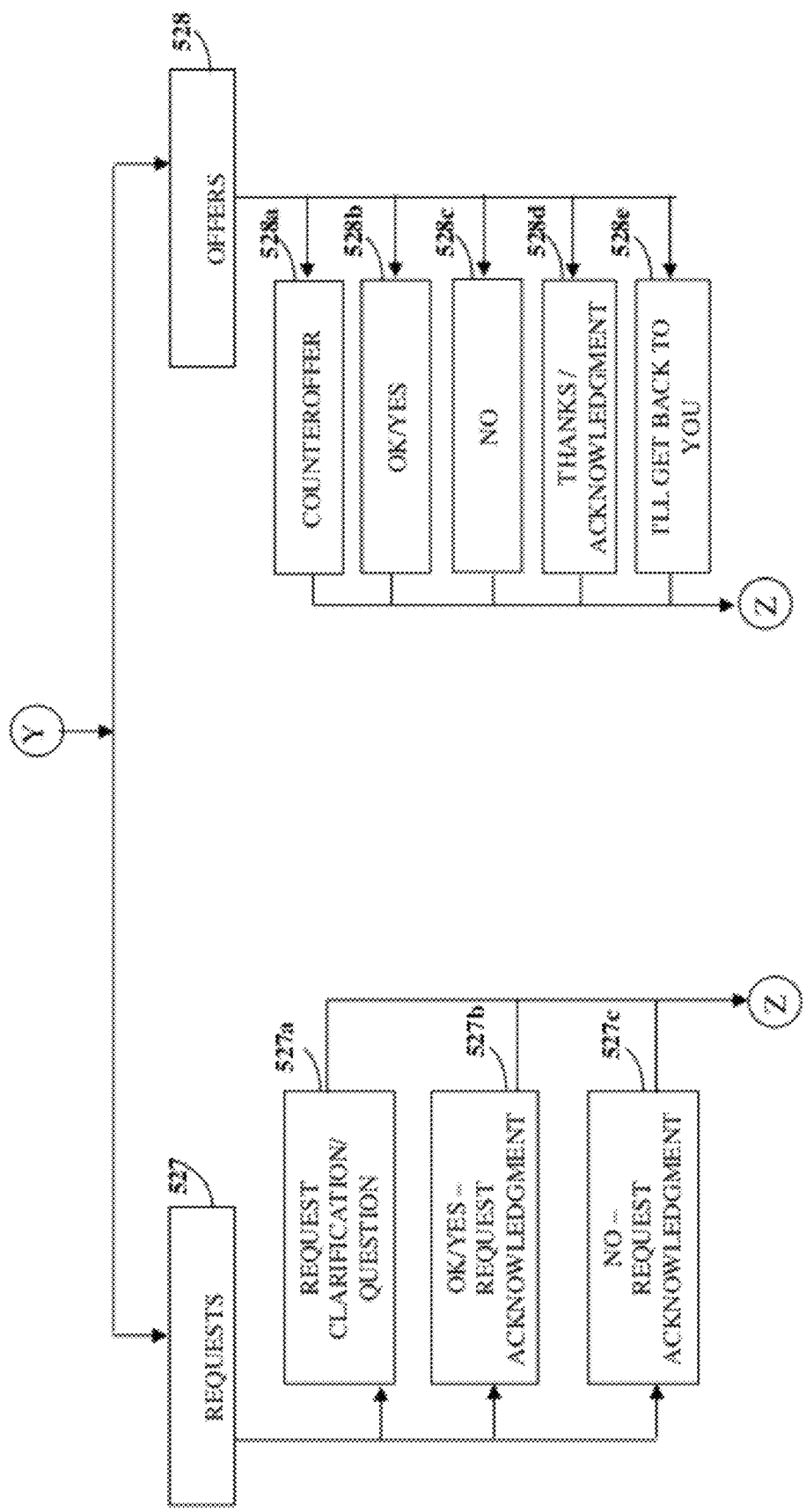
Figure 5G:
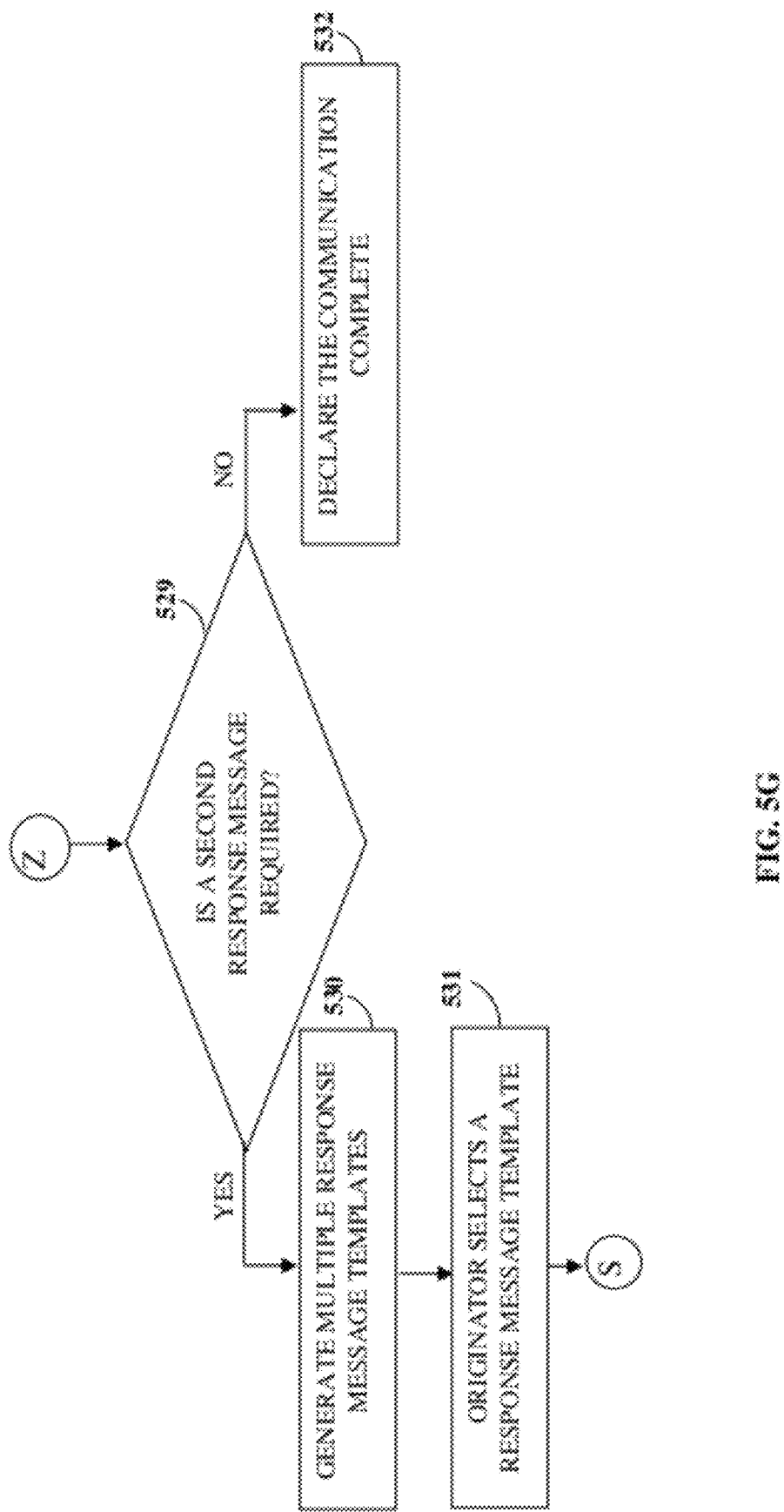
Figure 5H:
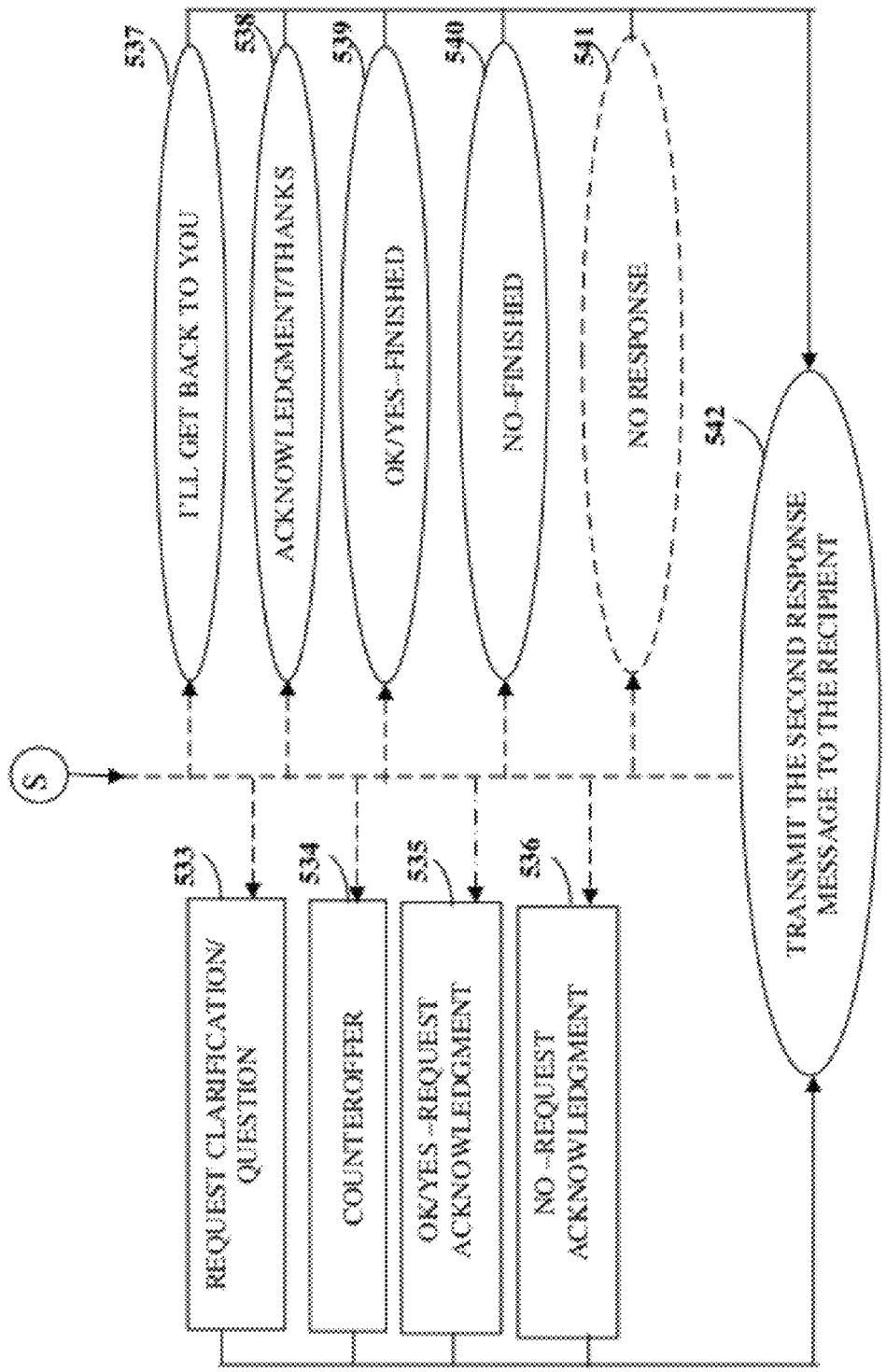

FIG. 4 exemplarily illustrates a flowchart comprising the steps of declaring characteristics of an originating message and transmitting the originating message by an originator 201 of the originating message to a recipient 202. The originator 201 initiates 401 the communication with an originating message. The originator 201 declares 402 the characteristics of the originating message by specifying the intent of communication and the linguistic type of communication. The originator 201 declares the linguistic characteristics of the originating message as either a request linguistic type of communication or an offer linguistic type of communication using the application software 205 provided on the originator communication device 204. If the originator 201 declares the originating message as a request linguistic type of communication, the originator 201 then declares 403 the subtype of the request linguistic type of communication. The subtypes of the request linguistic type of communication are, for example, a request decision 403a, a request help 403b, a request meeting 403c, a request phone call 403d, a request info (fact) 403e, a request opinion 403f, and a personal request 403g. If the originator 201 declares the originating message as an offer linguistic type of communication, the originator 201 then declares 404 the subtype of the offer linguistic type of communication. The subtypes of the offer linguistic type of communication are, for example, offer thanks 404a, offer help 404b, offer decision 404c, offer decision—request acknowledgment 404d, offer info (fact) 404e, offer opinion 404f, and personal offer 404g. The originator 201 after declaring the characteristics of the originating message transmits 405 the originating message to a recipient communication device 206 via the communication network 203.

FIGS. 5A-5D exemplarily illustrate a flowchart comprising the steps of classifying and categorizing the transmitted originating message on the recipient communication device 206 and creation of a first response message by the recipient 202 to the transmitted originating message using the automatically generated response message templates on the recipient communication device 206. The application software 205 on the recipient communication device 206 receives the transmitted originating message from the originator communication device 204. The application software 205 provided on the recipient communication device 206 recognizes the properties of the transmitted originating message and classifies 501 the transmitted originating message based on the recognized properties on the recipient communication device 206. The application software 205 recognizes the properties, for example, whether the transmitted originating message is of the direct mode 502 or the CC mode 503.

If the transmitted originating message is of the direct mode 502, the application software 205 on the recipient communication device 206 classifies the transmitted originating message as of direct mode 502. The application software 205 on the recipient communication device 206 determines that the transmitted originating message is of new status 504 and classifies the transmitted originating message as of direct mode 502 and of new status 504 on the recipient communication device 206.

If the transmitted originating message is of CC mode 503, the application software 205 on the recipient communication device 206 classifies the transmitted originating message as of CC mode 503. The application software 205 on the recipient communication device 206 determines that the transmitted originating message is of new status 504 and classifies the transmitted originating message as of CC mode 503 and of new status 504 on the recipient communication device 206.

The application software 205 on the recipient communication device 206 then recognizes the declared characteristics of the transmitted originating message and categorizes 505 the transmitted originating message based on the recognized declared characteristics on the recipient communication device 206. The application software 205 on the recipient communication device 206 determines whether the transmitted originating message is of request linguistic type of communication 506 or of offer linguistic type of communication 507. If the transmitted originating message is of the request linguistic type of communication 506, the application software 205 categorizes the transmitted originating message as one of, for example, request decision 506a, request acknowledgment of decision 506b, request help 506c, request meeting 506d, request phone call 506e, request info (fact) 506f, request opinion 506g, personal request 506h, etc. If the transmitted originating message is of the offer linguistic type of communication 507, the application software 205 categorizes the transmitted originating message as one of, for example, offer thanks 507a, offer help 507b, offer decision 507c, offer info (fact) 507d, offer opinion 507e, personal offer 507f, etc.

The application software 205 on the recipient communication device 206 then determines 508 whether a first response message is required as a reply to the transmitted originating message. If the first response message is not required as a reply to the transmitted originating message, the communication is declared 511 complete by the application software 205 on the recipient communication device 206. If the first response message is required as a reply to the transmitted originating message, the application software 205 on the recipient communication device 206 generates 509 multiple response message templates based on the categorization of the transmitted originating message. The recipient 202 selects 510 one of the generated response message templates to create the first response message as a reply to the transmitted originating message.

The generated response message templates are, for example, "request clarification/question" 512, "counteroffer" 513, "ok/yes—request acknowledgment" 514, "no—request acknowledgment" 515, "I'll get back to you" 516, "acknowledgment/thanks" 517, "ok/yes—finished" 518, "no—finished" 519, etc. The recipient 202 then transmits 521 the created first response message with the declared characteristics to the originator communication device 204 via the communication network 203. If the recipient 202 does not wish to create a first response message, the recipient 202 can do so by not selecting 520 any of the generated response message templates.

FIGS. 5E-5H exemplarily illustrate a flowchart comprising the steps of classifying and categorizing the transmitted first response message on the originator communication device 204 and creation of a second response message by the originator 201 using the automatically generated response message templates on the originator communication device 204. The application software 205 on the originator communication device 204 receives the transmitted first response message from the recipient communication device 206. The application software 205 provided on the originator communication device 204 recognizes the properties of the transmitted first response message and classifies 522 the transmitted first response message based on the recognized properties on the originator communication device 204. The application software 205 recognizes the properties, for example, whether the transmitted first response message is of the direct mode 523 or the CC mode 524.

If the transmitted first response message is of the direct mode 523, the application software 205 on the originator communication device 204 classifies the transmitted first response message as of direct mode 523. If the transmitted first response message is of the CC mode 524, the application software 205 on the originator communication device 204 classifies the transmitted first response message as of CC mode 524. The application software 205 determines that the transmitted first response message is of ongoing status 525 and classifies the transmitted first response message as of ongoing status 525 on the originator communication device 204.

The application software 205 on the originator communication device 204 then recognizes the declared characteristics of the transmitted first response message and categorizes 526 the transmitted first response message based on the recognized declared characteristics of the transmitted first response message on the originator communication device 204.

The application software 205 on the originator communication device 204 determines whether the transmitted first response message is of request linguistic type of communication 527 or of offer linguistic type of communication 528. If the transmitted first response message is of the request linguistic type of communication 527, the application software 205 categorizes the transmitted first response message as one of, for example, "request clarification/question" 527a, "ok—yes request acknowledgment" 527b, "no—request acknowledgment" 527c. If the transmitted first response message is of offer linguistic type of communication 528, the application software 205 categorizes the transmitted first response message as one of, for example, "counter offer" 528a, "ok—yes" 528b, "no" 528c, "thanks/acknowledgment" 528d, "I'll get back to you" 528e, etc.

The application software 205 on the originator communication device 204 determines 529 whether a second response message is required as a reply to the transmitted first response message. If the second response message is not required as a reply to the transmitted first response message, the communication is declared 532 complete by the application software 205 on the originator communication device 204. If the second response message is required as a reply to the transmitted first response message, the application software 205 on the originator communication device 204 generates 530 multiple response message templates based on the categorization of the transmitted first response message. The originator 201 selects 531 one of the generated response message templates to create a second response message as a reply to the transmitted first response message.

The generated response message templates are, for example, "request clarification/question" 533, "counteroffer" 534, "ok/yes—request acknowledgment" 535, "no—request acknowledgment" 536, "I'll get back to you" 537, "acknowledgment/thanks" 538, "ok/yes—finished" 539, "no—finished" 540, etc. The originator 201 then transmits 542 the created second response message with the declared characteristics to the recipient communication device 206 via the communication network 203. If the originator 201 does not wish to create a second response message, the recipient 202 can do so by not 541 selecting any of the generated response message templates.

FIGS. 6-7 exemplarily illustrate the generation of linguistic types and subtypes of communication used by the originator 201 and the recipient 202 for clarifying and categorizing electronic communication. The action type comprises the request linguistic type of communication and the offer linguistic type of communication.

The subtypes for a request linguistic type of communication available for a new status are, for example, request help, request decision, request meeting, request call, request info, request opinion, personal request, etc.

The response message templates generated when the declared characteristics of an originating message is of a request linguistic type of communication and of the subtype request help are, for example, "I'll get back to you", "request clarification", "counteroffer", "ok/yes", "no", "ok/yes—request acknowledgment", "no—request acknowledgment", etc.

The response message templates generated when the declared characteristics of an originating message is of a request linguistic type of communication and of the subtype request decision are, for example, "I'll get back to you", "request clarification", "counteroffer", "ok/yes", "no", "ok/yes—request acknowledgment", "no—request acknowledgment", etc.

The response message templates generated when the declared characteristics of an originating message is of a request linguistic type of communication and of the subtype request meeting are, for example, "I'll get back to you", "request clarification", "counteroffer", "ok/yes", "no", "ok/yes—request acknowledgment", "no—request acknowledgment", etc.

The response message templates generated when the declared characteristics of an originating message is of a request linguistic type of communication and of the subtype request call are, for example, "I'll get back to you", "request clarification", "counteroffer", "ok/yes", "no", "ok/yes—request acknowledgment", "no—request acknowledgment", etc.

The response message templates generated when the declared characteristics of an originating message is of a request linguistic type of communication and of the subtype request info are, for example, "I'll get back to you", "request clarification", "counteroffer", "ok/yes", "no", "ok/yes—request acknowledgment", "no—request acknowledgment", etc.

The response message templates generated when the declared characteristics of an originating message is of a request linguistic type of communication and of the subtype request opinion are, for example, "I'll get back to you", "request clarification", "counteroffer", "ok/yes", "no", "ok/yes—request acknowledgment", "no—request acknowledgment", etc.

The response message templates generated when the declared characteristics of an originating message is of a request linguistic type of communication and of the subtype personal request are, for example, "I'll get back to you", "request clarification", "counteroffer", "ok/yes", "no", "ok/yes—request acknowledgment", "no—request acknowledgment", etc.

The subtypes available for offer linguistic type of communication for a new status are, for example, offer help, offer decision, offer decision—request acknowledgment, offer thanks, offer info, offer opinion, personal offer, etc.

The response message templates generated when the declared characteristics of an originating message is of the offer linguistic type of communication and of the subtype offer help are, for example, "I'll get back to you", "request clarification", "counteroffer", "ok/yes", "no", "ok/yes—request acknowledgment", "no—request acknowledgment", "thanks/acknowledgment", etc.

The response message template generated when the declared characteristics of an originating message is of the offer linguistic type of communication and of the subtype offer decision is, for example, "thanks/acknowledgment", etc.

The response message templates generated when the declared characteristics of an originating message is of offer linguistic type of communication and of the subtype offer decision-request acknowledgment are, for example, "request clarification", "counteroffer", "thanks/acknowledgment", etc.

The response message template generated when the declared characteristics of an originating message is of offer linguistic type of communication and of the subtype offer thanks is, for example, "thanks/acknowledgment", etc.

The response message templates generated when the declared characteristics of an originating message is of offer linguistic type of communication and of the subtype offer info are, for example, "request clarification", "counteroffer", "acknowledgment", etc.

The response message templates generated when the declared characteristics of an originating message is of offer linguistic type of communication and of the subtype offer opinion are, for example, "request clarification", "counteroffer", "thanks/acknowledgment", etc.

The response message templates generated when the declared characteristics of an originating message is of offer linguistic type of communication and of the subtype personal offer are, for example, "I'll get back to you", "request clarification", "counteroffer", "ok/yes", "no", "ok/yes—request acknowledgment", "no—request acknowledgment", "thanks/acknowledgment", etc.

FIG. 7 exemplarily illustrates the response message templates generated on an originator communication device 204 and a recipient communication device 206 for an ongoing status based on the categorization of the response message.

If the transmitted first response message has the linguistic characteristic of the offer linguistic type of communication and the response subtype of "I'll get back to you", the response message templates generated are, for example, "request clarification", "counteroffer", "thanks/acknowledgment", etc.

If the transmitted first response message has the linguistic characteristic of the request linguistic type of communication and the response subtype "request clarification", the response message templates generated on the originator communication device 204 are, for example, "I'll get back to you", "request clarification", "counteroffer", "ok/yes", "ok/yes—request acknowledgment", etc If the transmitted first response message has the linguistic characteristic of the offer linguistic type of communication and the response subtype of "counteroffer", the response message templates generated on the originator communication device 204 are, for example, "I'll get back to you", "request clarification", "counteroffer", "ok/yes", "no", "ok/yes—request acknowledgment", "no—request acknowledgment", etc.

If the transmitted first response message has the linguistic characteristic of the offer linguistic type of communication and the response subtype of "ok/yes", the response message template generated on the originator communication device 204 is, for example, "thanks/acknowledgment", etc.

If the transmitted first response message has the linguistic characteristic of the offer linguistic type of communication and the response subtype of "ok/yes—request acknowledgment", the response message template generated on the originator communication device 204 is, for example, "thanks/acknowledgment", etc.

If the transmitted first response message has the linguistic characteristic of the offer linguistic type of communication and the response subtype of "no", the response message template generated on the originator communication device 204 is, for example, "thanks/acknowledgment", etc.

If the transmitted first response message has the linguistic characteristic of the offer linguistic type of communication and the response subtype of "no—request acknowledgment", the response message template generated on the originator communication device 204 is, for example, "thanks/acknowledgment", etc.

If the transmitted first response message has the linguistic characteristic of the offer linguistic type of communication and the response subtype of "thanks/acknowledgment", no response message template is generated because no response is required from the originator 201.

Figure 8:
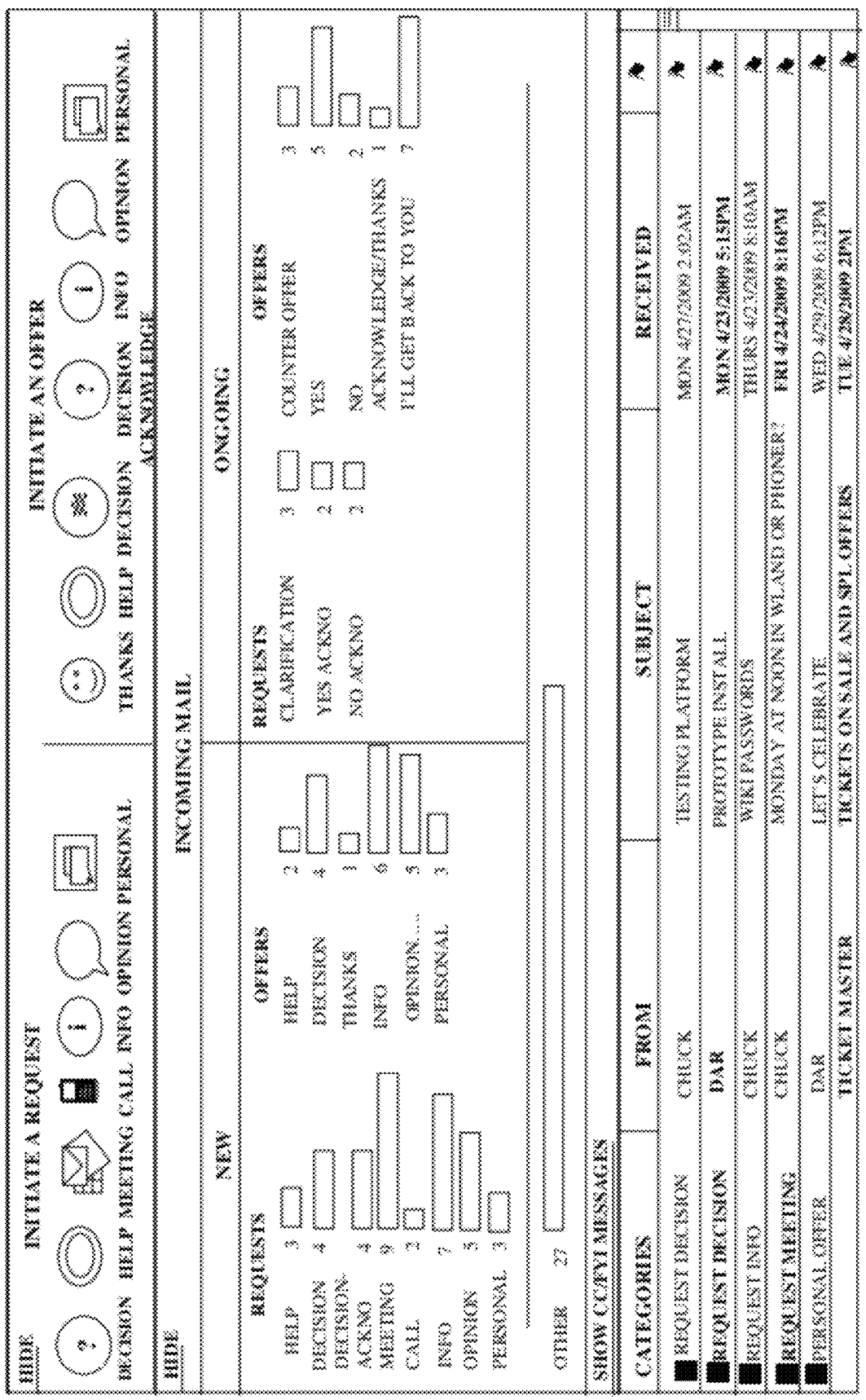
FIG. 8 exemplarily illustrates a graphical user interface provided by the application software on one or more of the originator communication device and the recipient communication device.

FIG. 8 exemplarily illustrates a GUI provided by the application software 205 on one or more of the originator communication device 204 and the recipient communication device 206.

The GUI illustrated in FIG. 8 comprises three sections. The first section comprises two components, for example, initiate a request and initiate an offer. The originator 201 of an originating message declares the linguistic characteristics of the originating message by selecting initiate a request or initiate an offer. The originator 201 of the originating message declares the linguistic characteristic of the originating message as a request linguistic type of communication by selecting one of the subtypes of request linguistic type of communication. The originator 201 of the originating message declares the originating message as an offer linguistic type of communication by selecting one of the subtypes of offer linguistic type of communication.

The second section is a summary of incoming messages received from a responder. The responder is, for example, an originator 201, a recipient 202, etc. Incoming messages comprise, for example, messages associated with new status 506, for example, the originating message, and messages associated with ongoing status 527, for example, the first response message, the second response message, etc. The incoming messages are classified by the properties, for example new status 506 and ongoing status 527, and categorized by declaration type, for example request linguistic type of communication and offer linguistic type of communication on the communication device of the responder. The application software 205 also summarizes all incoming undeclared messages and categorizes them separately, for example, as "other". A link is available, for example, to show carbon copy (CC)/for your information (FYI) messages. The responder clicks on the link to display the summary of CC messages.

The third section is a list view of the incoming messages categorized based on the subtype declared. The list view illustrates the categorization of the incoming messages based on the declared characteristics of the incoming message. The application software 205 categorizes the incoming messages based on declaration subtypes, for example, "personal offer", "request meeting", "request info", "request info", "request decision", etc. The application software 205 also automatically categorizes undeclared messages as a separate category.

FIG. 9 exemplarily illustrates a template for creating an originating message by the originator 201. The template is generated by the application software 205 on the originator communication device 204, for example, when the originator 201 declares the linguistic characteristics of the originating message as a request linguistic type of communication by selecting the subtype of request for decision from the first section of the GUI illustrated in FIG. 8. For example, Nathan Wilson wants to ask Chuck Wisner whether he has made a decision regarding the start date of a new project. Nathan Wilson initiates an originating message using the application software 205 installed on Nathan Wilson's communication device. Nathan Wilson declares the linguistic characteristics of the originating message as a request linguistic type of communication by selecting the subtype of request decision. Nathan Wilson creates the originating message and transmits the originating message to Chuck Wisner.

Figure 10:
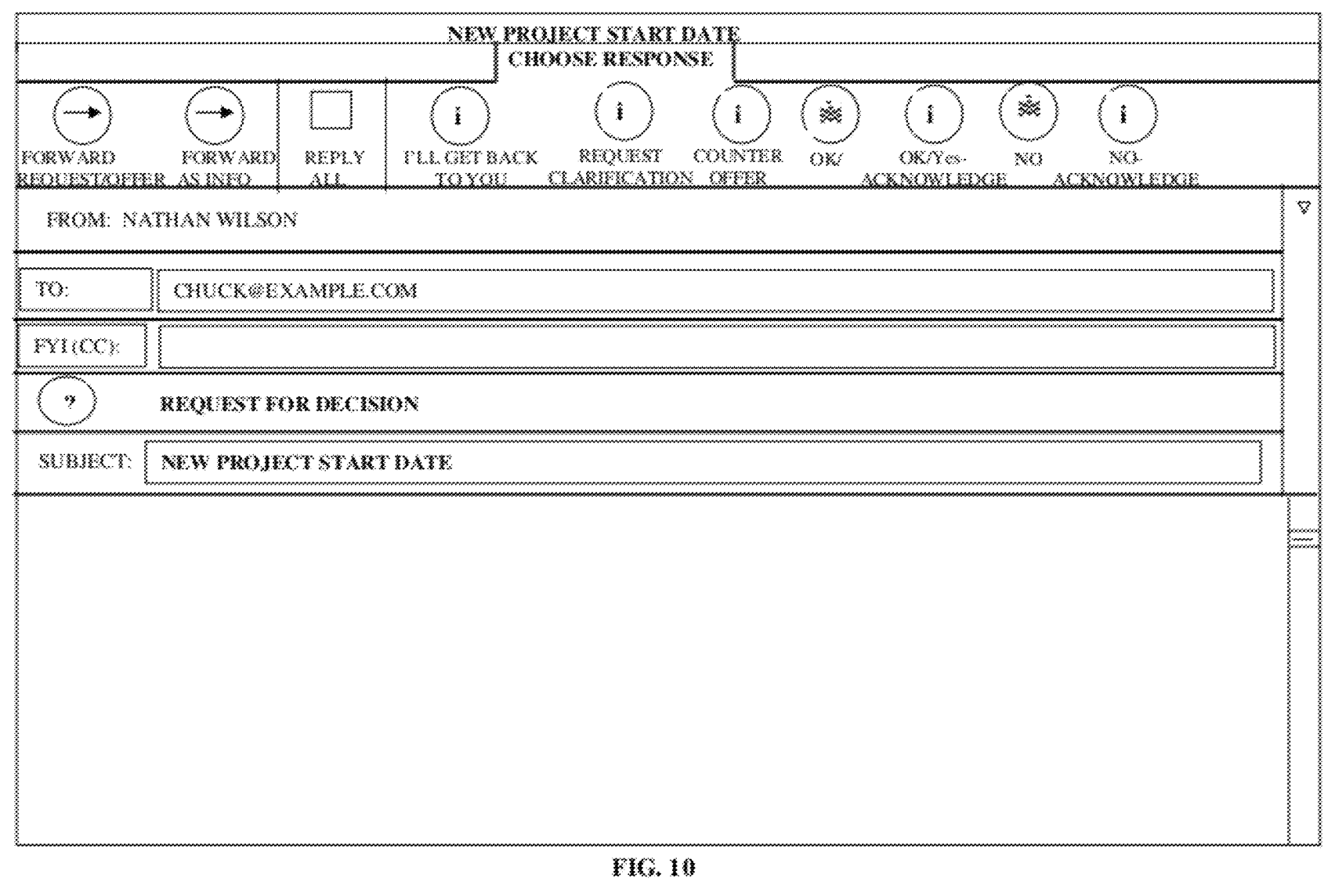

FIG. 10 exemplarily illustrates a transmitted originating message received by the recipient 202. Based on the categorization of the transmitted originating message on the recipient communication device 206, the application software 205 on the recipient communication device 206 generates multiple response message templates for creating a first response message to be transmitted to the originator 201. For example, Chuck Wisner's communication device receives the originating message transmitted by Nathan Wilson's communication device and recognizes the declared linguistic characteristics of the originating message. The application software 205 on Chuck Wisner's communication device classifies the originating message as of a new status and of direct mode and categorizes the originating message as a request linguistic type of communication and of subtype request decision. The application software 205 generates multiple response message templates based on the categorization.

Figure 11:
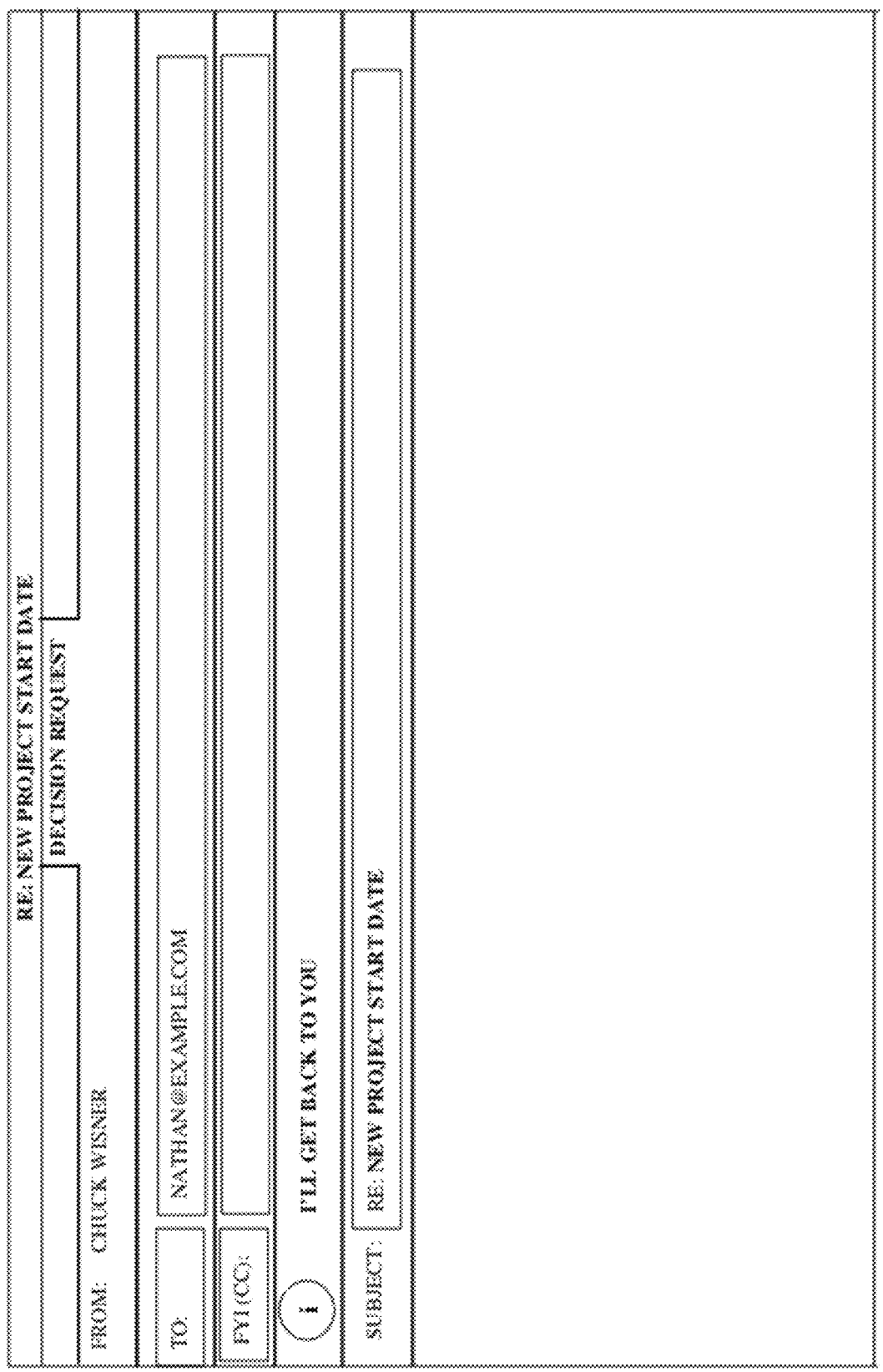
FIG. 11 exemplarily illustrates a response message template selected by the recipient, which specifies the intent and linguistic nature of the response message.

FIG. 11 exemplarily illustrates a response message template selected by the recipient 202, which specifies the intent and linguistic nature of the response message. For example, Chuck Wisner selects the template "I'll get back to you" from the generated response message templates and creates a first response message to be transmitted to Nathan Wilson.

Figure 12:
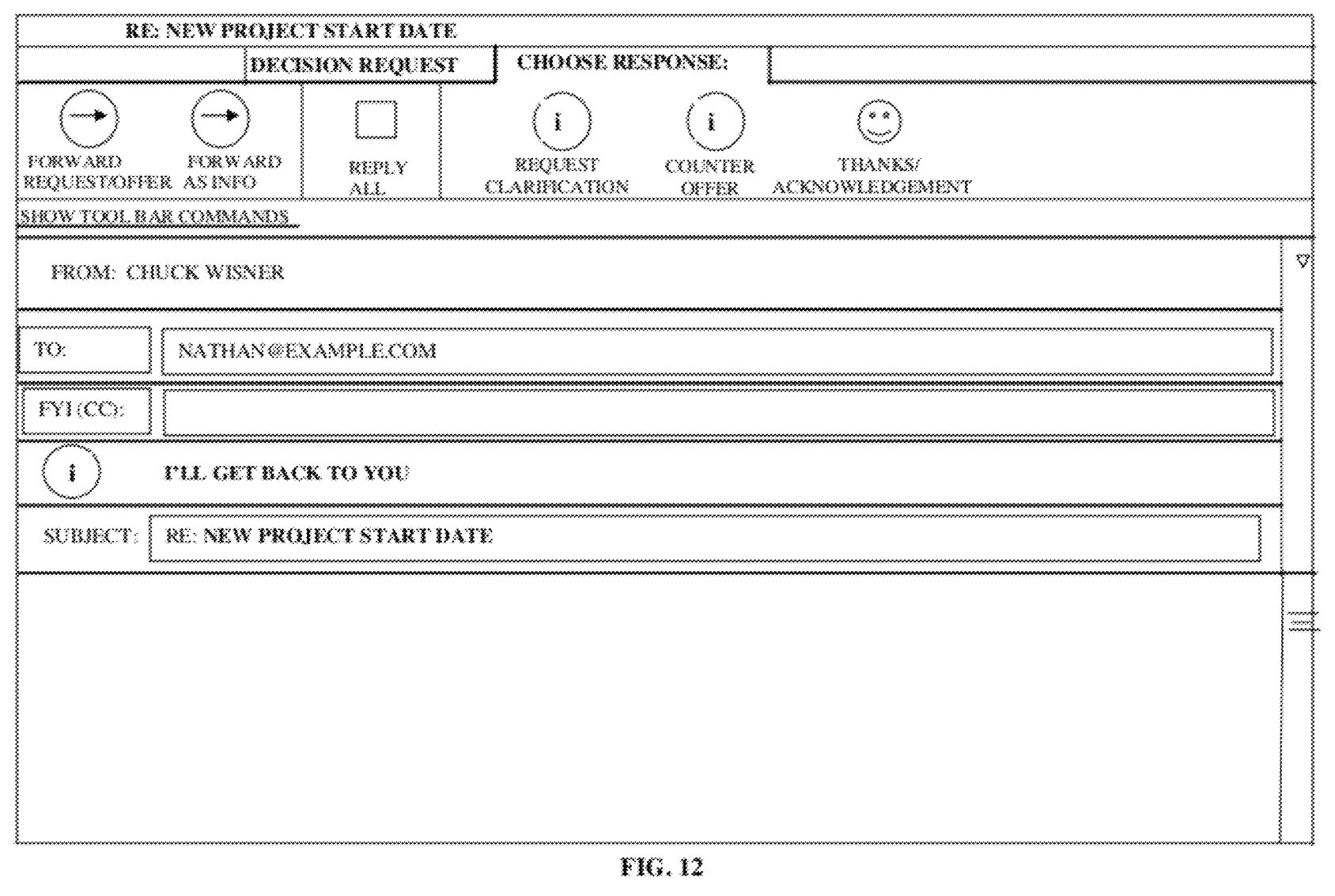

FIG. 12 exemplarily illustrates a transmitted first response message received by the originator 201. Nathan Wilson's communication receives the transmitted first response message transmitted by Chuck Wisner's communication device and categorizes the transmitted first response message based on the characteristics declared by the selected response message template. In this example, the application software 205 generates multiple response message templates on Nathan Wilson's communication device based on the categorization of the first response message. Nathan Wilson selects one of the generated response message templates to create a second response message to be transmitted to Chuck Wisner.

It will be readily apparent that the various methods and algorithms described herein may be implemented in a computer readable medium appropriately programmed for general purpose computers and computing devices. Typically a processor, for example, one or more microprocessors will receive instructions from a memory or like device, and execute those instructions, thereby performing one or more processes defined by those instructions. Further, programs that implement such methods and algorithms may be stored and transmitted using a variety of media, for example, computer readable media in a number of manners. The computer readable media has stored thereon multiple sequences of instructions which, when executed by a processor, cause the processor to perform the method disclosed herein. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer readable medium" refers to any medium that participates in providing data, for example instructions that may be read by a computer, a processor or a like device. Such a medium may take many forms, including but not limited to, non-volatile media, volatile media, and transmission media. Non volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer readable programs may be implemented in any programming language. Some examples of languages that can be used include C, C++, C#, or JAVA. The software programs may be stored on or in one or more mediums as an object code. A computer program product comprising computer executable instructions embodied in a computer readable medium comprises computer parsable codes for the implementation of the processes of various embodiments.

The present invention can be configured to work in a network environment including a computer that is in communication, via a communications network, with one or more devices. The computer may communicate with the devices directly or indirectly, via a wired or wireless medium such as the Internet, cellular network, satellite network, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, Sun® processors, IBM® processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method of clarifying electronic communication between an originator and a recipient, comprising:
    providing an application software on one or more of an originator communication device and a recipient communication device;
    declaring characteristics of an originating message using said application software on said originator communication device, wherein said declaration specifies intent of communication and linguistic type of communication of said originating message, wherein said declaration is used for categorization by said application software on said recipient communication device and formulation of a first response message by said recipient;
    transmitting said originating message with said declared characteristics to said recipient communication device via a communication network;
    recognizing said declared characteristics of said transmitted originating message by said application software on said recipient communication device, wherein said recognition enables said recipient to formulate said first response message to said transmitted originating message;
    categorizing said transmitted originating message by said application software on said recipient communication device based on said recognized declared characteristics of said transmitted originating message;
    determining requirement of said first response message as a reply to said transmitted originating message, by said application software on said recipient communication device;
    generating a plurality of response message templates on said recipient communication device based on said categorization on determining said requirement of said first response message, wherein said response message templates declare characteristics of said first response message, wherein said declaration specifies intent of communication and linguistic type of communication of said first response message, wherein said recipient selects one of said generated response message templates for creating said first response message to be transmitted to said originator; and
    transmitting said created first response message to said originator communication device via said communication network;
whereby said declaration of said characteristics of said originating message and said first response message clarifies said electronic communication between said originator and said recipient.

2. The computer implemented method of claim 1, further comprising recognizing properties of said transmitted originating message by said application software on said recipient communication device, wherein said properties of said transmitted originating message comprise status of communication and mode of addressing said originating message.

3. The computer implemented method of claim 2, further comprising classifying said transmitted originating message by said application software on said recipient communication device based on said recognized properties of said transmitted originating message.

4. The computer implemented method of claim 1, further comprising creating said originating message by said originator on said originator communication device after said declaration of said characteristics of said originating message using said application software on said originator communication device.

5. The computer implemented method of claim 1, wherein said linguistic type of communication is a request linguistic type of communication and an offer linguistic type of communication.

6. The computer implemented method of claim 1, wherein said linguistic type of communication comprises a plurality of subtypes for enabling declaration of additional characteristics of said originating message and said first response message.

7. The computer implemented method of claim 1, wherein said declared characteristics of said originating message are one of embedded in said originating message and referenced by said originating message.

8. The computer implemented method of claim 1, wherein said declared characteristics of said first response message are embedded in said first response message.

9. The computer implemented method of claim 1, further comprising:
   recognizing said declared characteristics of said transmitted first response message by said application software on said originator communication device, wherein said recognition enables said originator to formulate a second response message to said transmitted first response message; and
   categorizing said transmitted first response message by said application software on said originator communication device based on said recognized declared characteristics of said transmitted first response message.

10. The computer implemented method of claim 9, further comprising classifying said transmitted first response message by said application software on said originator communication device based on properties of said transmitted first response message, wherein said properties of said transmitted first response message comprise status of communication and mode of addressing said first response message.

11. The computer implemented method of claim 1, wherein said electronic communication comprises electronic mail communication, short message service communication, multimedia messaging service communication, and instant messaging communication.

12. The computer implemented method of claim 1, further comprising iteratively determining requirement of response messages by said application software on said originator communication device and said recipient communication device until said electronic communication is declared complete.

13. A computer implemented system for clarifying electronic communication between an originator and a recipient, comprising:
   an application software on one or more of an originator communication device and a recipient communication device;
   said application software on said originator communication device, comprising:
      a characteristic declaration module that declares characteristics of an originating message on said originator communication device, wherein said characteristic declaration module specifies intent of communication and linguistic type of communication of said originating message for enabling categorization by said application software on said recipient communication device and formulation of a first response message by said recipient;
      an originating message transmission module that transmits said originating message with said declared characteristics to said recipient communication device via a communication network;
   said application software on said recipient communication device comprising:
      a recognition module that recognizes said declared characteristics of said transmitted originating message, wherein said recognition module determines requirement of said first response message as a reply to said transmitted originating message and enables said recipient to formulate said first response message to said transmitted originating message;
      a categorization engine that categorizes said transmitted originating message on said recipient communication device based on said recognized declared characteristics of said transmitted originating message;
      a response message template generation module that generates a plurality of response message templates on said recipient communication device based on said categorization, wherein said response message templates declare characteristics of said first response message, wherein said declaration specifies intent of communication and linguistic type of communication of said first response message, wherein said recipient selects one of said generated response message templates for creating said first response message to be transmitted to said originator; and
      a response message transmission module that transmits said created first response message to said originator communication device via said communication network.

14. The computer implemented system of claim 13, wherein said recognition module recognizes properties of said transmitted originating message, wherein said properties of said transmitted originating message comprise status of communication and mode of addressing said originating message.

15. The computer implemented system of claim 14, wherein said application software further comprises a classification engine that classifies said transmitted originating message and said transmitted first response message on said recipient communication device and said originator communication device respectively based on said recognized properties of said transmitted originating message and said transmitted first response message respectively.

16. The computer implemented system of claim 13, wherein said application software on said originator communication device further comprises an originating message template generation module that creates said originating message on said originator communication device after said declaration of said characteristics of said originating message.

17. The computer implemented system of claim 13, wherein said characteristic declaration module performs one of embedding said declared characteristics in said originating message and referencing said declared characteristics in said originating message.

18. A computer program product comprising computer executable instructions embodied in non-transitory a computer readable storage medium, wherein said computer program product comprises:
   a first computer parsable program code for providing an application software on one or more of an originator communication device and a recipient communication device;
   a second computer parsable program code for declaring characteristics of an originating message using said application software on said originator communication device, wherein said declaration specifies intent of communication and linguistic type of communication of said originating message, wherein said declaration is used for categorization by said application software on said recipient communication device and formulation of a first response message by a recipient;

a third computer parsable program code for creating said originating message on said originator communication device;

a fourth computer parsable program code for transmitting said created originating message with said declared characteristics to said recipient communication device via a communication network;

a fifth computer parsable program code for recognizing said declared characteristics of said transmitted originating message on said recipient communication device, wherein said recognition enables said recipient to formulate said first response message to said transmitted originating message;

a sixth computer parsable program code for categorizing said transmitted originating message on recipient communication device based on said recognized declared characteristics of said transmitted originating message;

a seventh computer parsable program code for determining requirement of said first response message as a reply to said transmitted originating message;

an eighth computer parsable program code for generating a plurality of response message templates on said recipient communication device based on said categorization on determining said requirement of said first response message, wherein said response message templates declare characteristics of said first response message, wherein said declaration specifies intent of communication and linguistic type of communication of said first response message, wherein said recipient selects one of said generated response message templates for creating said first response message to be transmitted to said originator; and a ninth computer parsable program code for transmitting said created first response message to said originator communication device via said communication network.

19. The computer program product of claim 18, further comprising a tenth computer parsable program code for recognizing properties of said transmitted originating message and said transmitted first response message, wherein said properties of said transmitted originating message and said transmitted first response message comprise status of communication and mode of addressing said originating message and said first response message.

20. The computer program product of claim 18, further comprising an eleventh computer parsable program code for classifying said transmitted originating message and said transmitted first response message on said recipient communication device and said originator communication device respectively based on said recognized properties of said transmitted originating message and said transmitted first response message respectively.

21. The computer program product of claim 18, further comprising a twelfth computer parsable program code for performing one of embedding said declared characteristics in one of said originating message and said first response message and referencing said declared characteristics in said one of said originating message and said first response message.

22. The computer program product of claim 18, further comprising a thirteenth computer parsable program code for iteratively determining requirement of response messages on said originator communication device and said recipient communication device until said electronic communication is declared complete.

* * * * *